US010645142B2

(12) United States Patent
Stoop et al.

(10) Patent No.: US 10,645,142 B2
(45) Date of Patent: May 5, 2020

(54) VIDEO KEYFRAMES DISPLAY ON ONLINE SOCIAL NETWORKS

(71) Applicant: Facebook, Inc., Menlo Park, CA (US)

(72) Inventors: Dirk John Stoop, Menlo Park, CA (US); Adam Eugene Bussing, San Francisco, CA (US); Oliver Scholz, Menlo Park, CA (US); Balmanohar Paluri, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 504 days.

(21) Appl. No.: 15/270,960

(22) Filed: Sep. 20, 2016

(65) Prior Publication Data

US 2018/0084023 A1  Mar. 22, 2018

(51) Int. Cl.
*H04L 15/16* (2006.01)
*H04L 29/08* (2006.01)
*H04L 29/06* (2006.01)

(52) U.S. Cl.
CPC .......... *H04L 67/02* (2013.01); *H04L 65/4084* (2013.01); *H04L 65/602* (2013.01); *H04L 67/306* (2013.01)

(58) Field of Classification Search
CPC ..... H04L 65/60; H04L 65/607; H04L 65/601; H04L 65/608; G06F 17/30017; G06F 17/30846; G06F 17/30849
USPC .................................................. 709/217, 219
See application file for complete search history.

(56) References Cited

U.S. PATENT DOCUMENTS

| 5,918,014 | A  | 6/1999 | Robinson |
| 6,539,232 | B2 | 3/2003 | Hendrey |
| 6,957,184 | B2 | 10/2005 | Schmid |
| 7,069,308 | B2 | 6/2006 | Abrams |
| 7,379,811 | B2 | 5/2008 | Rasmussen |
| 7,539,697 | B1 | 5/2009 | Akella |
| 7,752,326 | B2 | 7/2010 | Smit |

(Continued)

FOREIGN PATENT DOCUMENTS

| KR | 20060011324 | 2/2006 |
| WO | WO 2007/046708 A1 | 4/2007 |
| WO | WO 2011/149648 A2 | 12/2011 |

OTHER PUBLICATIONS

PCT International Search Report, received for PCT Application No. PCT/US2016/052794, dated Apr. 28, 2017.

(Continued)

*Primary Examiner* — Wing F Chan
*Assistant Examiner* — Andrew Woo
(74) *Attorney, Agent, or Firm* — Jordan IP Law, LLC

(57) ABSTRACT

In one embodiment, a method includes receiving a query from a user for videos; identifying videos matching the query; retrieving, for each identified video, a set of keyframes that are associated with one or more concepts; calculating, for each keyframe of each identified video, a keyframe-score based on a prevalence of the concepts associated with the keyframe, determined with reference to the concepts associated with each other keyframe in the set of retrieved keyframes for the identified video; and sending, to the first user, a search-results interface including search results corresponding to one or more of the identified videos, each search result comprising keyframes for the corresponding identified video having keyframe-scores greater than a threshold keyframe-score.

19 Claims, 10 Drawing Sheets

(56) References Cited

U.S. PATENT DOCUMENTS

| | | |
|---|---|---|
| 7,783,630 B1 | 8/2010 | Chevalier |
| 7,797,635 B1 | 9/2010 | Denise |
| 7,836,044 B2 | 11/2010 | Kamvar |
| 8,027,990 B1 | 9/2011 | Mysen |
| 8,055,673 B2 | 11/2011 | Churchill |
| 8,060,639 B2 | 11/2011 | Smit |
| 8,082,278 B2 | 12/2011 | Agrawal |
| 8,112,529 B2 | 2/2012 | Van Den Oord |
| 8,135,721 B2 | 3/2012 | Joshi |
| 8,145,636 B1 | 3/2012 | Jeh |
| 8,180,804 B1 | 5/2012 | Narayanan |
| 8,185,558 B1 | 5/2012 | Narayanan |
| 8,209,330 B1 | 6/2012 | Covell |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2* | 12/2013 | Behforooz .......... G06F 17/3053 707/790 |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 2002/0059199 A1 | 5/2002 | Harvey |
| 2002/0086676 A1 | 7/2002 | Hendrey |
| 2002/0170062 A1 | 11/2002 | Chen |
| 2002/0175932 A1 | 11/2002 | Yu et al. |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0088723 A1 | 5/2004 | Ma |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0228849 A1* | 10/2005 | Zhang .................... G11B 27/28 709/200 |
| 2005/0256756 A1 | 11/2005 | Lam |
| 2006/0041597 A1 | 2/2006 | Conrad |
| 2006/0106764 A1 | 5/2006 | Girgensohn et al. |
| 2006/0117378 A1 | 6/2006 | Tam |
| 2006/0136419 A1 | 6/2006 | Brydon |
| 2006/0190436 A1 | 8/2006 | Richardson |
| 2007/0174304 A1 | 7/2007 | Shrufi |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0150784 A1 | 6/2009 | Denney et al. |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0321399 A1 | 12/2010 | Ellren |
| 2011/0004609 A1 | 1/2011 | Chitiveli |
| 2011/0022602 A1 | 1/2011 | Luo |
| 2011/0047163 A1* | 2/2011 | Chechik ............... G06F 16/7867 707/741 |
| 2011/0078166 A1 | 3/2011 | Oliver |
| 2011/0087534 A1 | 4/2011 | Strebinger |
| 2011/0137902 A1 | 6/2011 | Wable |
| 2011/0184981 A1 | 7/2011 | Lu |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0042020 A1 | 2/2012 | Kolari |
| 2012/0047147 A1 | 2/2012 | Redstone |
| 2012/0059708 A1 | 3/2012 | Galas |
| 2012/0110080 A1 | 5/2012 | Panyam |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |

(56) References Cited

U.S. PATENT DOCUMENTS

| | | |
|---|---|---|
| 2013/0086024 A1 | 4/2013 | Liu |
| 2013/0086057 A1 | 4/2013 | Harrington |
| 2013/0097140 A1 | 4/2013 | Scheel |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |
| 2013/0254155 A1 | 9/2013 | Thollot |
| 2013/0254305 A1 | 9/2013 | Cheng |
| 2014/0006416 A1 | 1/2014 | Leslie |
| 2014/0067535 A1 | 3/2014 | Rezaei |
| 2014/0122465 A1 | 5/2014 | Bilinski |
| 2014/0280080 A1 | 9/2014 | Solheim |
| 2014/0304429 A1 | 10/2014 | Softky |
| 2014/0366068 A1* | 12/2014 | Burkitt ................ H04N 21/431 725/61 |
| 2015/0036919 A1 | 2/2015 | Bloom |
| 2015/0074289 A1 | 3/2015 | Hyman |
| 2015/0161519 A1 | 6/2015 | Zhong |
| 2015/0286643 A1 | 10/2015 | Kumar |
| 2015/0363402 A1 | 12/2015 | Jackson |
| 2016/0026727 A1 | 1/2016 | Bar-Yossef |
| 2016/0041982 A1 | 2/2016 | He |
| 2016/0042067 A1 | 2/2016 | Weng |
| 2016/0063093 A1 | 3/2016 | Boucher |
| 2016/0063115 A1 | 3/2016 | Ayan |
| 2016/0162502 A1 | 6/2016 | Zhou |
| 2016/0203238 A1 | 7/2016 | Cherniayskii |

OTHER PUBLICATIONS

U.S. Appl. No. 14/983,385, filed Dec. 29, 2015, Nikhil Johri.
Extended European search report received from the EPO, for EP Patent Application No. 17164123.6-1871, dated Nov. 8, 2017.
EP Communication received from EPO for Patent Application No. 17164123.6-1217, dated Feb. 26, 2019.

* cited by examiner

VIDEO KEYFRAMES DISPLAY ON ONLINE SOCIAL NETWORKS

TECHNICAL FIELD

This disclosure generally relates to social graphs and user interfaces for videos within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

With the large number of videos now available to users, one problem that arises for a user intending to watch videos is the difficulty of sorting through and selecting videos with content that is of interest to the user. The user often has to resort to a time-consuming and inefficient process of watching portions of videos before selecting a video that is actually of interest to the user. The methods described herein attempt to address this problem by displaying to the user a select number of noteworthy frames—or "keyframes"— from videos that serve to visually summarize the videos. Such a display may offer to the user a meaningful preview of the contents of the video by presenting key moments and concepts depicted in the key frames. The preview may be displayed to the user whenever the user is presented with a video on the social-networking system (e.g., on a search-results interface, on a newsfeed, on a profile interface, in a video gallery, in a private message). Based on this preview, the user may be able to review at a high level what the video is about (and to determine other information about the video, such as visual quality) with minimal time investment. The user may be able to then decide whether or not to invest the time to watch the video. The preview may also be useful in promoting the viewing of video content generally and in promoting the use of video search functionality, by piquing the user's interest in particular videos and by showcasing to the user the breadth of relevant and diverse content that exists within available videos. Furthermore, the user may be able to play back the video from particular keyframes, such that user may use the preview as a means to quickly navigate through the video from keyframe to keyframe (e.g., to jump to portions of the video that may be of interest to the user). The methods herein also have the added technical advantage of creating a lightweight interactive experience for the user so that the user is able to gather information about one or more videos quickly, minimizing latency, and conserving bandwidth and processor resources (e.g., by reducing the need for the user to load and watch multiple videos before selecting one). To further these objectives, the social-networking system, among other things, may package the keyframes in a data-efficient format, and may leverage pre-caching methods to create a more lightweight user experience.

In particular embodiments, the social-networking system may receive, from a client system of a first user, a search query for one or more videos (e.g., a search query inputted by the first user). The social-networking system may identify one or more videos that match the search query. Each of the identified videos may be associated with (e.g., indexed with) a set of keyframes, which may be frames from the respective identified video (e.g., noteworthy frames). The social-networking system may retrieve, for each identified video, the set of keyframes for the identified video. Each of the keyframes may be associated with one or more concepts (e.g., concepts represented by concept nodes on the social graph). The social-networking system may calculate, for each keyframe of each identified video, a keyframe-score. The keyframe-score may be based on a prevalence of the one or more concepts associated with the keyframe. The prevalence of each of the concepts associated with a particular keyframe of a particular identified video may be determined with reference to the one or more concepts associated with each other keyframe in the set of retrieved keyframes for the particular identified video. The social-networking system may send, to the client system of the first user for display, a search-results interface that includes one or more search results corresponding to one or more of the identified videos. Each search result may include one or more keyframes for the corresponding identified video that are determined to be "optimal keyframes," which may be keyframes having keyframe-scores greater than a threshold keyframe-score. Although this disclosure focuses on keyframes for videos, it contemplates keyframes for any suitable media item (e.g., animated GIFs, slideshows, etc.). Furthermore, the description of the use of keyframes, while often focused on the use of keyframes in the search context, may be generally applicable in other contexts where videos are displayed to a user.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
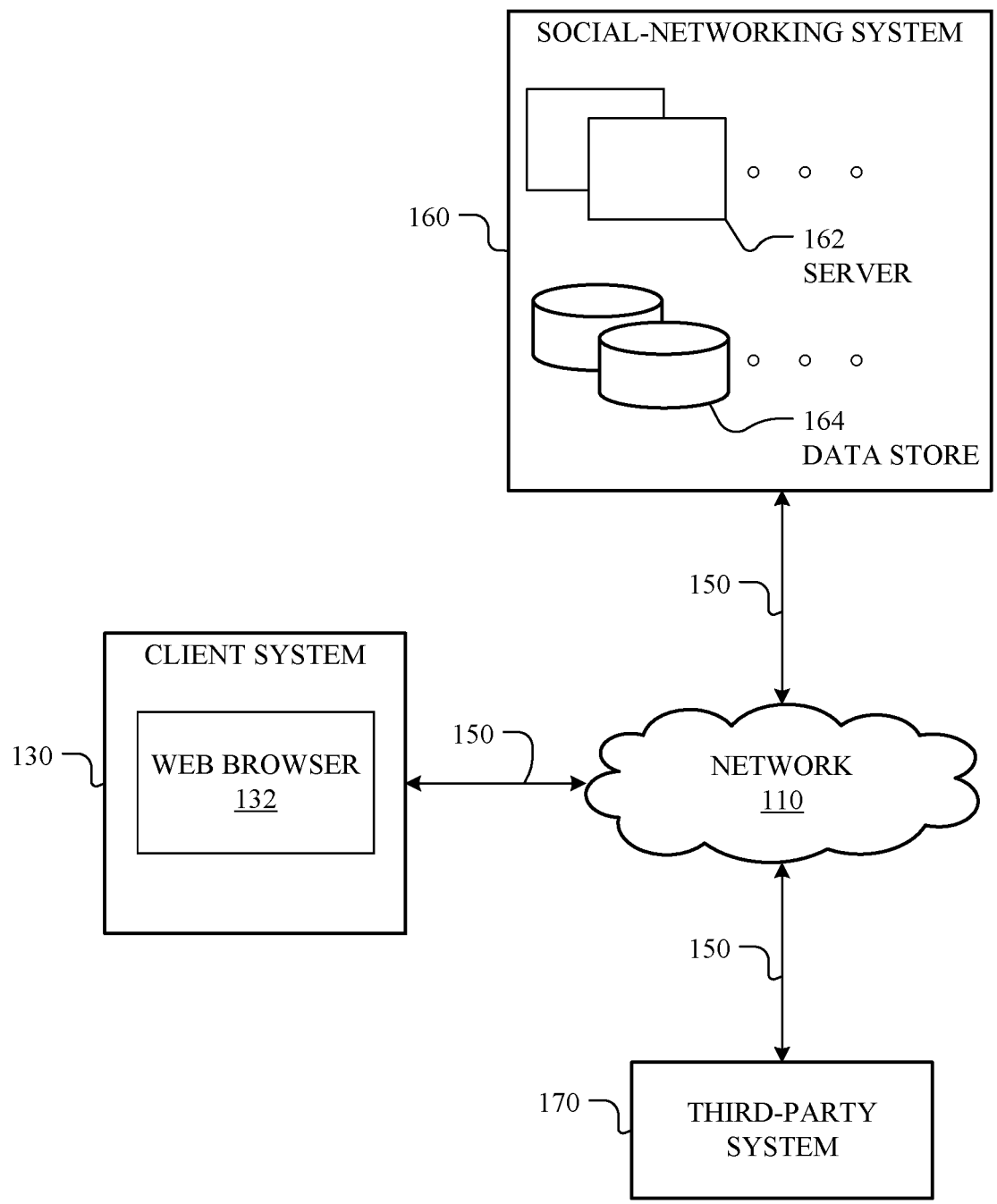
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
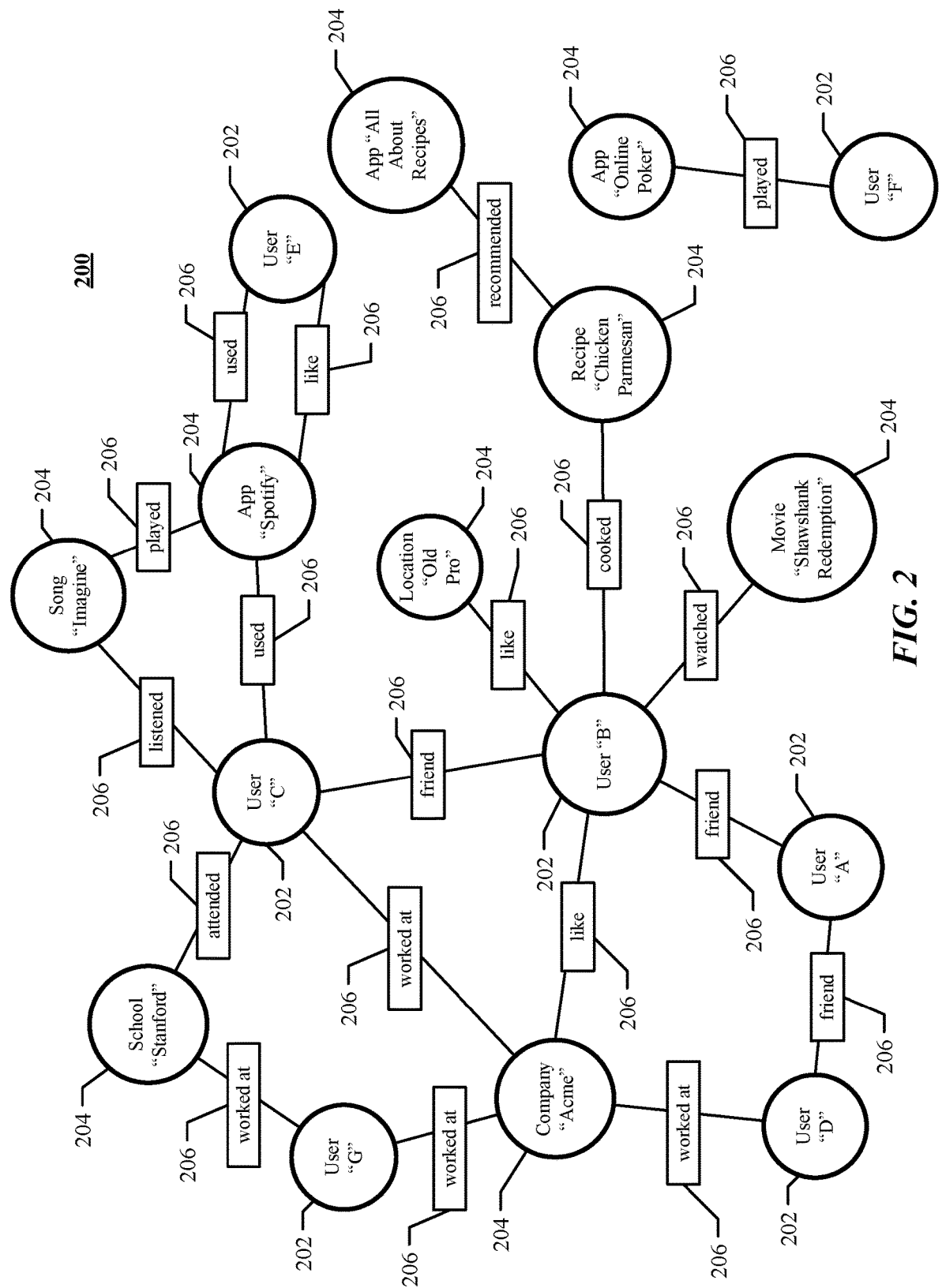
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party server 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other interactable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, the social-networking system 160 may receive, from a client system 130 of a user of an online social network, a query inputted by the user. The user may submit the query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile interfaces, external web interfaces, or any combination thereof. The social-networking system 160 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 160 may then send the search-results interface to the web browser 132 on the user's client system 130. The user may then click on the URL links or otherwise select the content from the search-results interface to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 202 or concept nodes 204, such as a profile interface named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile interfaces and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Indexing Based on Object-Type

Figure 3:
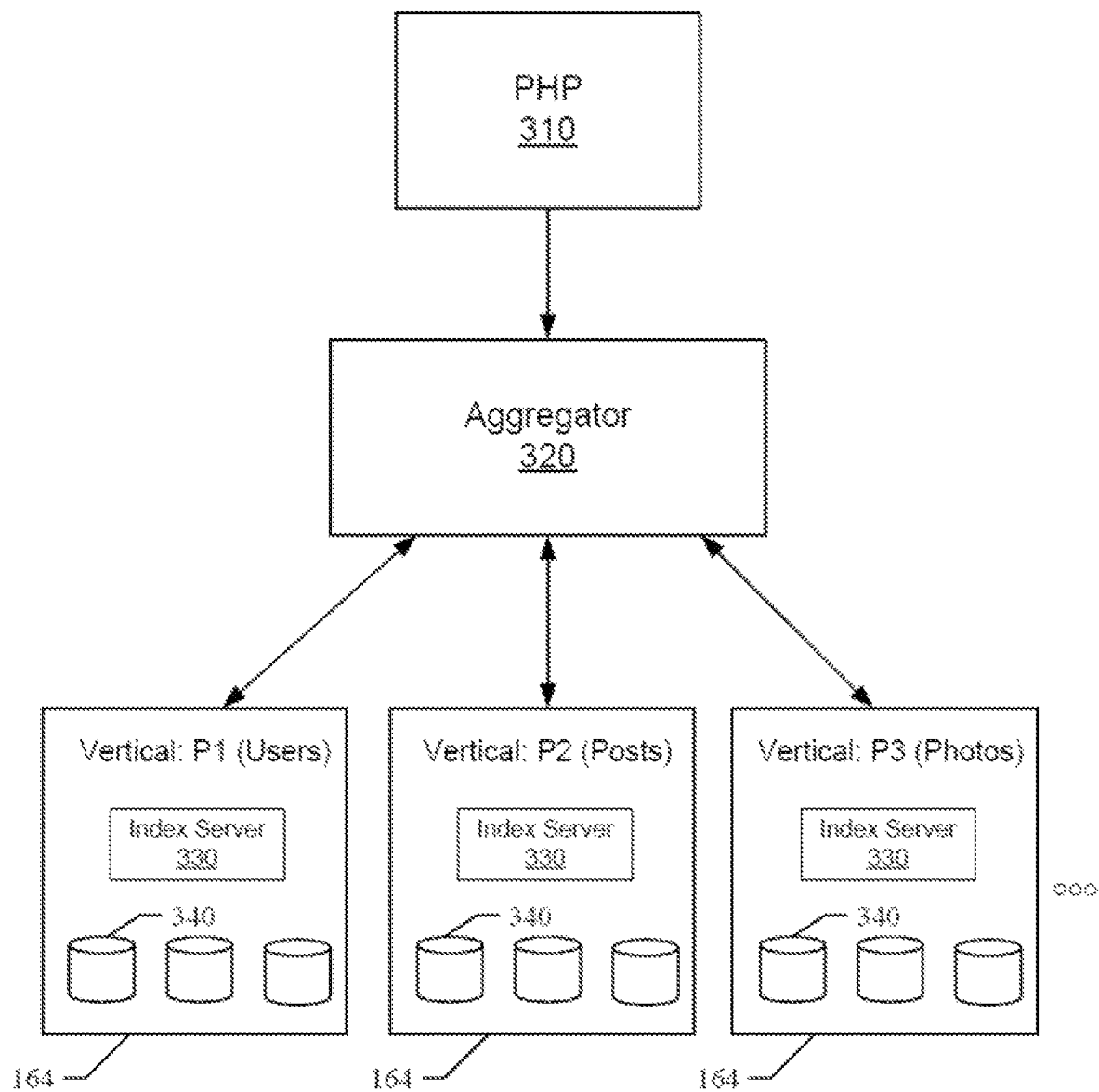
FIG. 3. illustrates an example partitioning for storing objects of social-networking system.

FIG. 3 illustrates an example partitioning for storing objects of social-networking system 160. A plurality of data stores 164 (which may also be called "verticals") may store objects of social-networking system 160. The amount of data (e.g., data for a social graph 200) stored in the data stores may be very large. As an example and not by way of limitation, a social graph used by Facebook, Inc. of Menlo Park, Calif. can have a number of nodes in the order of $10^8$, and a number of edges in the order of $10^{10}$. Typically, a large collection of data such as a large database may be divided into a number of partitions. As the index for each partition of a database is smaller than the index for the overall database, the partitioning may improve performance in accessing the database. As the partitions may be distributed over a large number of servers, the partitioning may also improve performance and reliability in accessing the database. Ordinarily, a database may be partitioned by storing rows (or columns) of the database separately. In particular embodiments, a database maybe partitioned based on object-types. Data objects may be stored in a plurality of partitions, each partition holding data objects of a single object-type. In particular embodiments, social-networking system 160 may retrieve search results in response to a search query by submitting the search query to a particular partition storing objects of the same object-type as the search query's expected results. Although this disclosure describes storing objects in a particular manner, this disclosure contemplates storing objects in any suitable manner.

In particular embodiments, each object may correspond to a particular node of a social graph 200. An edge 206 connecting the particular node and another node may indicate a relationship between objects corresponding to these nodes. In addition to storing objects, a particular data store may also store social-graph information relating to the object. Alternatively, social-graph information about particular objects may be stored in a different data store from the objects. Social-networking system 160 may update the search index of the data store based on newly received objects, and relationships associated with the received objects.

In particular embodiments, each data store 164 may be configured to store objects of a particular one of a plurality of object-types in respective data storage devices 340. An object-type may be, for example, a user, a photo, a post, a comment, a message, an event listing, a web interface, an application, a location, a user-profile interface, a concept-profile interface, a user group, an audio file, a video, an offer/coupon, or another suitable type of object. Although this disclosure describes particular types of objects, this disclosure contemplates any suitable types of objects. As an example and not by way of limitation, a user vertical P1 illustrated in FIG. 3 may store user objects. Each user object stored in the user vertical P1 may comprise an identifier (e.g., a character string), a user name, and a profile picture for a user of the online social network. Social-networking system 160 may also store in the user vertical P1 information associated with a user object such as language, location, education, contact information, interests, relationship status, a list of friends/contacts, a list of family members, privacy settings, and so on. As an example and not by way of limitation, a post vertical P2 illustrated in FIG. 3 may store post objects. Each post object stored in the post vertical P2 may comprise an identifier, a text string for a post posted to social-networking system 160. Social-networking system 160 may also store in the post vertical P2 information associated with a post object such as a time stamp, an author, privacy settings, users who like the post, a count of likes, comments, a count of comments, location, and so on. As an example and not by way of limitation, a photo vertical P3 may store photo objects (or objects of other media types such as video or audio). Each photo object stored in the photo vertical P3 may comprise an identifier and a photo. Social-networking system 160 may also store in the photo vertical P3 information associated with a photo object such as a time stamp, an author, privacy settings, users who are tagged in the photo, users who like the photo, comments, and so on. In particular embodiments, each data store may also be configured to store information associated with each stored object in data storage devices 340.

In particular embodiments, objects stored in each vertical 164 may be indexed by one or more search indices. The search indices may be hosted by respective index server 330 comprising one or more computing devices (e.g., servers). The index server 330 may update the search indices based on data (e.g., a photo and information associated with a photo) submitted to social-networking system 160 by users or other processes of social-networking system 160 (or a third-party system). The index server 330 may also update the search indices periodically (e.g., every 24 hours). The index server 330 may receive a query comprising a search term, and access and retrieve search results from one or more search indices corresponding to the search term. In some embodiments, a vertical corresponding to a particular object-type may comprise a plurality of physical or logical partitions, each comprising respective search indices.

In particular embodiments, social-networking system 160 may receive a search query from a PHP (Hypertext Preprocessor) process 310. The PHP process 310 may comprise one or more computing processes hosted by one or more servers 162 of social-networking system 160. The search query may be a text string or a search query submitted to the PHP process by a user or another process of social-networking system 160 (or third-party system 170). In particular embodiments, an aggregator 320 may be configured to receive the search query from PHP process 310 and distribute the search query to each vertical. The aggregator may comprise one or more computing processes (or programs) hosted by one or more computing devices (e.g. servers) of the social-networking system 160. Particular embodiments may maintain the plurality of verticals 164 as illustrated in FIG. 3. Each of the verticals 164 may be configured to store a single type of object indexed by a search index as described earlier. In particular embodiments, the aggregator 320 may receive a search request. For example, the aggregator 320 may receive a search request from a PHP (Hypertext Preprocessor) process 210 illustrated in FIG. 2. In particular embodiments, the search request may comprise a text string. The search request may be a structured or substantially unstructured text string submitted by a user via a PHP process. The search request may also be structured or a substantially unstructured text string received from another process of the social-networking system. In particular embodiments, the aggregator 320 may determine one or more search queries based on the received search request (step 303). In particular embodiments, each of the search queries may have a single object type for its expected results (i.e., a single result-type). In particular embodiments, the aggregator 320 may, for each of the search queries, access and retrieve search query results from at least one of the verticals 164, wherein the at least one vertical 164 is configured to store objects of the object type of the search query (i.e., the result-type of the search query). In particular embodiments, the aggregator 320 may aggregate search query results of the respective search queries. For example, the aggregator 320 may submit a search query to a particular vertical and access index server 330 of the vertical, causing index server 330 to return results for the search query.

More information on indexes and search queries may be found in U.S. patent application Ser. No. 13/560,212, filed 27 Jul. 2012, U.S. patent application Ser. No. 13/560,901, filed 27 Jul. 2012, U.S. patent application Ser. No. 13/723,861, filed 21 Dec. 2012, and U.S. patent application Ser. No. 13/870,113, filed 25 Apr. 2013, each of which is incorporated by reference.

Video Keyframes Display

With the large number of videos now available to users, one problem that arises for a user intending to watch videos is the difficulty of sorting through and selecting videos with content that is of interest to the user. The user often has to resort to a time-consuming and inefficient process of watching portions of videos before selecting a video that is actually of interest to the user. The methods described herein attempt to address this problem by displaying to the user a select number of noteworthy frames—or "keyframes"—from videos that serve to visually summarize the videos. Such a display may offer to the user a meaningful preview of the contents of the video by presenting key moments and concepts depicted in the key frames. The preview may be displayed to the user whenever the user is presented with a video on the social-networking system 160 (e.g., on a search-results interface, on a newsfeed, on a profile interface, in a video gallery, in a private message). Based on this preview, the user may be able to review at a high level what the video is about (and to determine other information about the video, such as visual quality) with minimal time investment. The user may be able to then decide whether or not to invest the time to watch the video. The preview may also be useful in promoting the viewing of video content generally and in promoting the use of video search functionality, by piquing the user's interest in particular videos and by showcasing to the user the breadth of relevant and diverse content that exists within available videos. Furthermore, the user may be able to play back the video from particular keyframes, such that user may use the preview as a means to quickly navigate through the video from keyframe to keyframe (e.g., to jump to portions of the video that may be of interest to the user). The methods herein also have the added advantage of creating a lightweight interactive experience for the user so that the user is able to gather information about one or more videos quickly, minimizing latency, and conserving bandwidth and processor resources (e.g., by reducing the need for the user to load and watch multiple videos before selecting one). To further these objectives, the social-networking system 160, among other things, may package the keyframes in a data-efficient format, and may leverage pre-caching methods to create a more lightweight user experience.

In particular embodiments, the social-networking system 160 may receive, from a client system 130 of a first user, a search query for one or more videos (e.g., a search query inputted by the first user). The social-networking system 160 may identify one or more videos that match the search query. Each of the identified videos may be associated with (e.g., indexed with) a set of keyframes, which may be frames from the respective identified video (e.g., noteworthy frames). The social-networking system 160 may retrieve, for each identified video, the set of keyframes for the identified video. Each of the keyframes may be associated with one or more concepts (e.g., concepts represented by concept nodes on the social graph 200). The social-networking system 160 may calculate, for each keyframe of each identified video, a keyframe-score. The keyframe-score may be based on a prevalence of the one or more concepts associated with the keyframe. The prevalence of each of the concepts associated with a particular keyframe of a particular identified video may be determined with reference to the one or more concepts associated with each other keyframe in the set of retrieved keyframes for the particular identified video. The social-networking system 160 may send, to the client system 130 of the first user for display, a search-results interface that includes one or more search results corresponding to one or more of the identified videos. Each search result may include one or more keyframes for the corresponding identified video that are determined to be "optimal keyframes," which may be keyframes having keyframe-scores greater than a threshold keyframe-score. Although this disclosure focuses on keyframes for videos, it contemplates keyframes for any suitable media item (e.g., animated GIFs, slideshows, etc.). Furthermore, the description of the use of keyframes, while often focused on the use of keyframes in the search context, may be generally applicable in other contexts where videos are displayed to a user.

Figure 4:
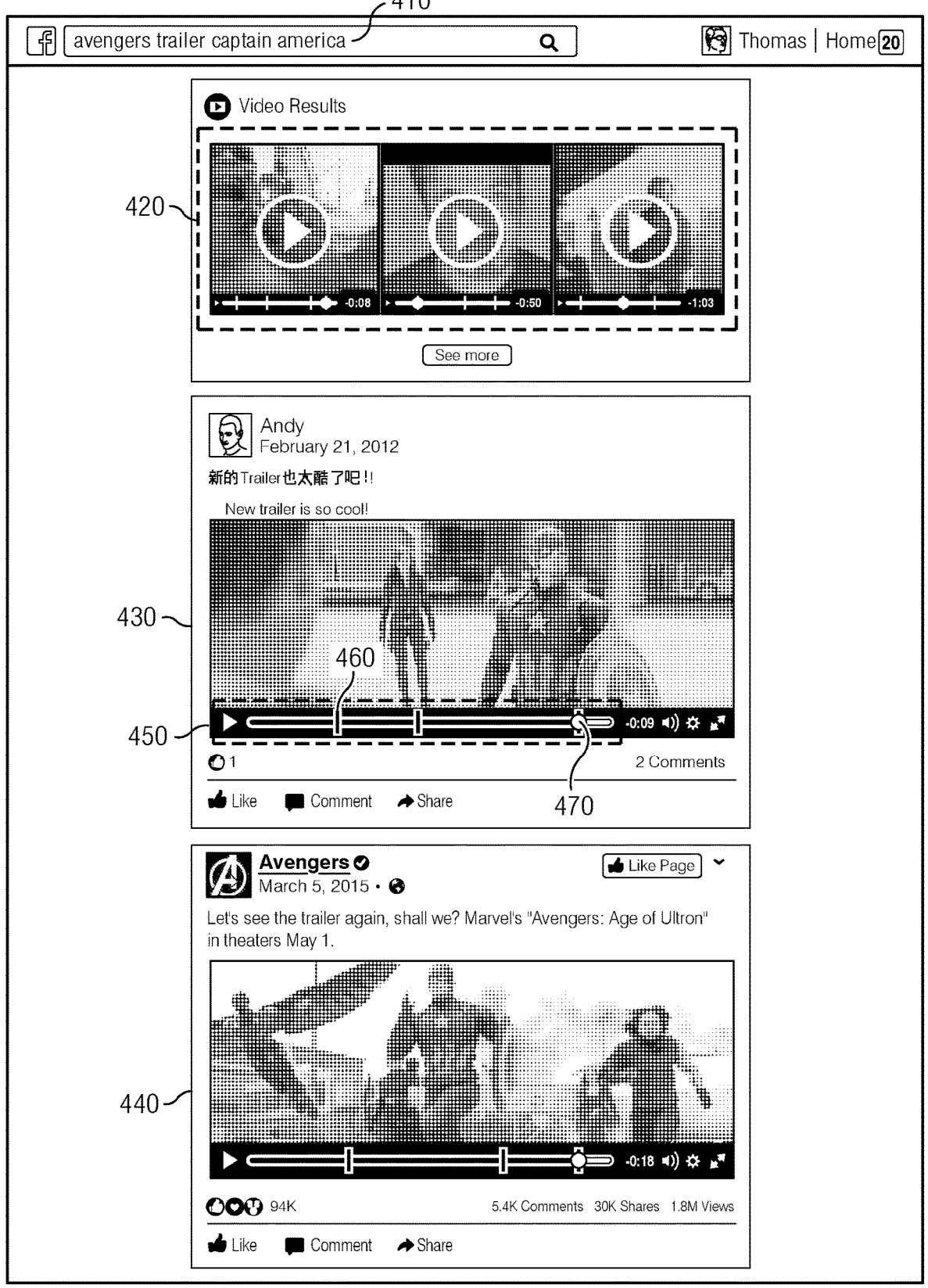
FIG. 4 illustrates an example search-results interface displayed in response to a search query.

FIG. 4 illustrates an example search-results interface displayed in response to a search query. In particular embodiments, the social-networking system 160 may receive, from a client system 130 of a first user, a search query for one or more videos (e.g., a search query inputted by the first user). The social-networking system 160 may infer determine that a search query is directed to videos based on any suitable factors that predict a user intent to search for videos. As an example and not by way of limitation, the social-networking system 160 may determine that a search query is directed to videos if the search query is inputted by the first user into a search field that is set to search only for videos, or if the first user submits a selection input that specifies that the search is to be limited to videos. As another example and not by way of limitation, the social-networking system 160 may determine that a search query is directed to videos if the search query includes n-grams that explicitly or implicitly specify a user intent to search for videos. In this example, the first user may have submitted a search query for "cat video" (e.g., where the n-gram "video" specifies a user intent to search for videos) or a search query "age of ultron trailer" (e.g., where the n-gram "trailer" specifies a user intent to search for videos because the word "trailer" in searches may be usually directed to movie trailer videos). As another example and not by way of limitation, the social-networking system 160 may determine that a search query is directed to videos if executing the search query yields a relatively large set of matching video search results (or a relatively high percentage of video search results within the set of total search results). In this example, the execution of the search query for purposes of determining user intent in this manner may be done on the backend before any search results are sent to the first user for display. The social-networking system 160 may parse the search query to identify one or more n-grams that may be extracted by the social-networking system 160. In particular embodiments, the social-networking system 160 may make use of a Natural Language Processing (NLP) analysis in parsing through the search query to identify the n-grams. In general, an n-gram may be a contiguous sequence of n items from a given sequence of text. The items may be characters, phonemes, syllables, letters, words, base pairs, prefixes, or other identifiable items from the sequence of text or speech. An n-gram may include one or more characters of text (letters, numbers, punctuation, etc.) in the content of a post or the metadata associated with the post. In particular embodiments, each n-gram may include a character string (e.g., one or more characters of text). In particular embodiments, an n-gram may include more than one word. As an example and not by way of limitation, referencing FIG. 4, the social-networking system 160 may parse some or all of the text of the search query in the search field 410 (e.g., "avengers trailer captain America") to identify n-grams that may be extracted. The social-networking system 160 may identify, among others, the following n-grams: avengers; trailer; avengers trailer; captain; America; captain America. In particular embodiments, the social-networking system 160 may perform one or more suitable pre-processing steps, such as removing certain numbers and punctuation (including the "#" character in a hashtag), removing or replacing special characters and accents, and/or lower-casing all text. In particular embodiments, the social-networking system 160 may use a term frequency-inverse document frequency (TF-IDF) analysis to remove insignificant terms from the search query. The TF-IDF is a statistical measure used to evaluate how important a term is to a document (e.g., a particular post on the online social network that includes one or more videos) in a collection or corpus (e.g., a set of posts on the online social network that include one or more videos). The less important a term is in the collection or corpus, the less likely it may be that the term will be extracted as an n-gram. The importance increases proportionally to the number of times a term appears in a particular document, but is offset by the frequency of the term in the corpus of documents. The importance of a term in a particular document is based in part on the term count in a document, which is simply the number of times a given term (e.g., a word) appears in the document. This count may be normalized to prevent a bias towards longer documents (which may have a higher term count regardless of the actual importance of that term in the document) and to give a measure of the importance of the term t within the particular document d. Thus we have the term frequency tf(t,d), defined in the simplest case as the occurrence count of a term in a document. The inverse-document frequency (idf) is a measure of the general importance of the term which is obtained by dividing the total number of documents by the number of documents containing the term, and then taking the logarithm of that quotient. A high weight in TF-IDF is reached by a high term frequency in the given document and a low document frequency of the term in the whole collection of documents; the weights hence tend to filter out common terms. As an example and not by way of limitation, referencing FIG. 4, a TF-IDF analysis of the text of the search query in search field 410 (e.g., "avengers trailer captain America") may determine that the n-grams "avengers" and "captain" should be extracted as n-grams, where these terms have high importance within the search query. Similarly, a TF-IDF analysis of the text in the search query may determine that the n-gram "trailer" should not be extracted as an n-gram, where this term has a low importance within the search query (e.g., because it may be a common term in many posts on the online social network that include videos or in video titles or descriptions, and therefore do not help narrow the set of search results in any nontrivial manner). More information on determining terms of low importance in search queries may be found in U.S. patent application Ser. No. 14/877,624, filed 7 Oct. 2015, which is incorporated by reference. In particular embodiments, the social-networking system 160 may receive a search query that includes one or more media items (e.g., emojis, photos, audio files). The social-networking system 160 may translate these media items to n-grams using a video index or other media index, as described in U.S. patent application Ser. No. 14/952,707, filed 25 Nov. 2015, which is incorporated by reference. Although this disclosure describes receiving a particular type of query from particular sources in a particular manner, it contemplates receiving any suitable type of query from any suitable source in any suitable manner.

In particular embodiments, the social-networking system 160 may execute the search query to identify one or more videos that match the search query. The social-networking system 160 may do so by accessing one or more video indexes of the social-networking system 160 that index videos with associated keywords and attempting to match the extracted n-grams of the search query against the keywords of the video indexes. The identified videos may include videos that are indexed with keywords matching one or more of the extracted n-grams of the search query or with keywords that are associated with one or more of the extracted n-grams (e.g., by being associated with one or more topics in common). More information on retrieving videos based on n-grams of a search query using a video index or other media index may be found in U.S. patent application Ser. No. 14/952,707, filed 25 Nov. 2015, which is incorporated by reference. Although this disclosure describes identifying a particular type of content in a particular manner, it contemplates identifying any suitable content in any suitable manner.

Figure 5:
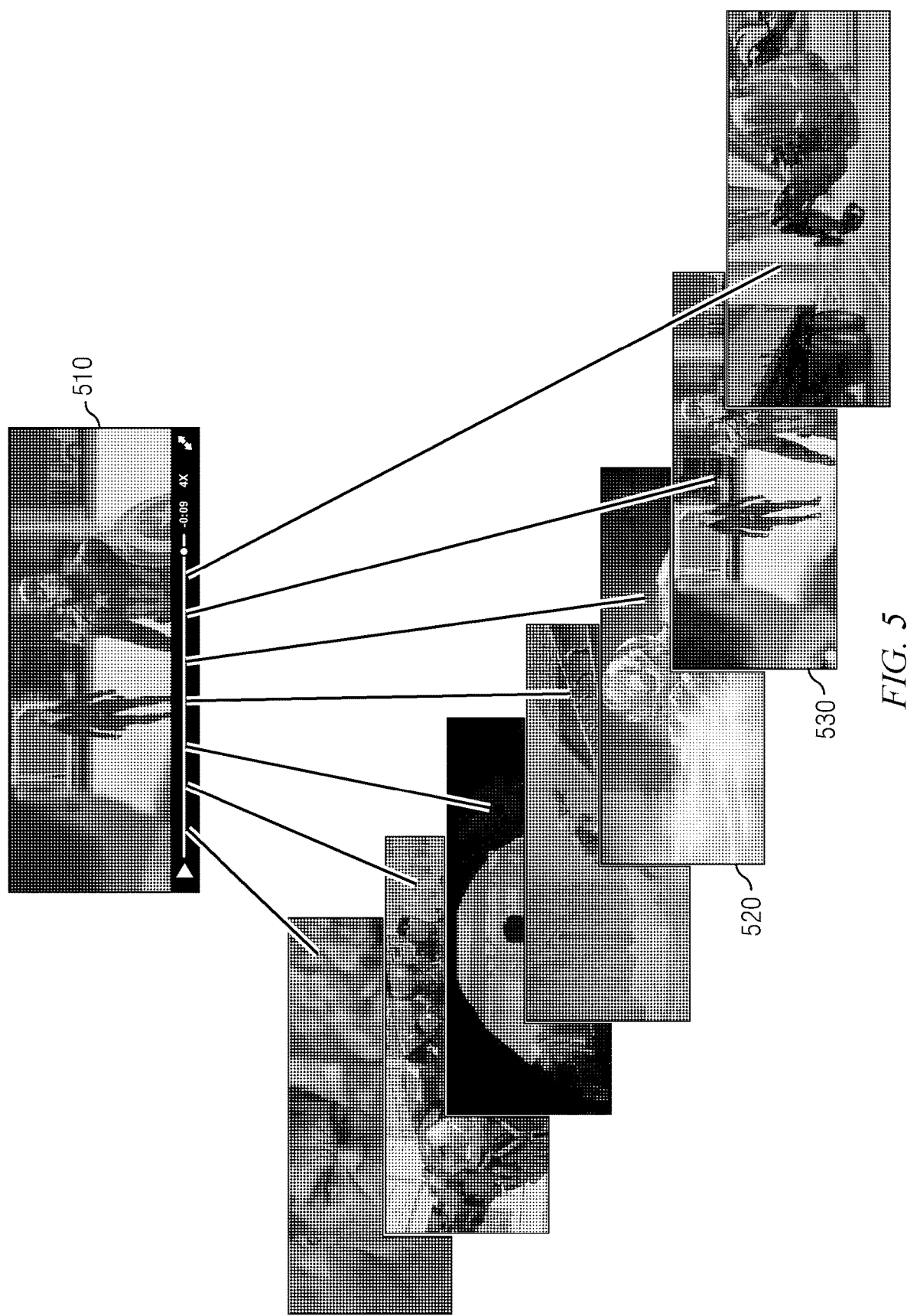
FIG. 5 illustrates an example set of keyframes for a video.

FIG. 5 illustrates an example set of keyframes for a video. In particular embodiments, the social-networking system 160 may retrieve, for each identified video, a set of keyframes for the identified video. A keyframe may be a frame of the identified video that is, in some way, noteworthy. Keyframes may serve to summarize the video or highlight portions of the video that may be interesting to the first user or to users in general. In particular embodiments, the set of keyframes for a video may have been previously determined by the social-networking system 160 or by a third-party system 170 (e.g., a system associated with the creator or the publisher of the video). As an example and not by way of limitation, the social-networking system 160 may have determined the keyframes during or shortly after the respective video was uploaded on the online social network. In particular embodiments, videos may be indexed with their respective keyframes in a video index (e.g., within a video vertical 164 hosted in one or more index servers 330), such that the social-networking system 160 may query the video index to retrieve the respective keyframes for the identified videos. In particular embodiments, keyframe data (e.g., data specifying the time-points of the keyframes or other information associated with the keyframes) of a video may be stored as metadata of the video. In these embodiments, the social-networking system 160 may access the metadata when it accesses the video upon execution of the query, and may subsequently generate the keyframes of the video. In particular embodiments, the keyframes themselves may be stored as metadata of the video. Alternatively, in particular embodiments, the set of keyframes may be determined and generated by the social-networking system 160 upon the execution of the search query. Although this disclosure describes determining particular frames in a particular manner by a particular system, it contemplates determining any suitable frames in any suitable manner by any particular system (e.g., a third-party system 170).

In particular embodiments, one or more of the keyframes may be frames that correspond to the beginnings of one or more scenes of the video, identified at least in part by detecting scene changes in the video. In particular embodiments, the social-networking system 160 may select the first frame of a scene that is of a threshold visual quality (e.g., a frame that is of sufficient resolution, contrast, etc.). In particular embodiments, the social-networking system 160 may detect a scene change based on metadata associated with the video. As an example and not by way of limitation, a video may have metadata associated with it (e.g., introduced by a creator, an editor, or an uploader of the video) that demarcates different chapters or scenes of the video. In particular embodiments, the social-networking system 160 may determine scene-changes based on a scene-detection algorithm that analyzes the video to detect frames where the video shifts from a first scene to a second scene. The scene-detection algorithm may use any suitable information to detect a scene change. In particular embodiments, a scene change may be detected based on changes in color, brightness, contrast, or other visual information in the images of a videos frames. As an example and not by way of limitation, the social-networking system 160 may detect a scene change when a series of frames cause a "fade to black" effect in the video, which may be the indication of a new scene to a viewer. As another example and not by way of limitation, the social-networking system 160 may detect a change in colors from a scene in a city (which may feature frames that have a high concentration of colors such as gray, black, white) to a scene in the countryside (which may feature frames that have a high concentration of colors such as green, blue, and red). Although this disclosure describes the detection of scene changes by the social-networking system 160 in a particular manner, such detection may equally occur at any suitable a third-party system 170 in any suitable manner.

In particular embodiments, the social-networking system 160 may detect a scene change based on changes in the concepts recognized to be in the frames using an image-recognition process. As an example and not by way of limitation, referencing FIG. 5, the social-networking system 160 may recognize in the frame 520 the concept "Ultron" (e.g., corresponding to a character depicted in the frame 520), the concept "James Spade" (e.g., corresponding to the voice actor who plays the character Ultron in the associated movie, Avengers: Age of Ultron), the concept "Ultron Energy Blast" (e.g., corresponding to a blast of energy depicted in the frame 520), and any other concepts that may be recognized in the frame. Similarly, the social-networking system 160 may recognize one or more concepts in the frame 530 (e.g., "Captain America"). In this example, the social-networking system 160 may determine that a scene change occurred at some point between the frame 520 and the frame 530 based on the differences in their respective concepts. More information on analyzing image- or video-content to recognize concepts may be found in U.S. patent application Ser. No. 13/959,446, filed 5 Aug. 2013, and U.S. patent application Ser. No. 14/983,385, filed 29 Dec. 2015, each of which is incorporated by reference. In particular embodiments, the social-networking system 160 may analyze one or more frames preceding and/or following a particular frame to recognize concepts associated with a particular frame. As an example and not by way of limitation, for a particular frame with an image of an explosion, the social-networking system 160 may use image recognition to analyze one or more preceding frames and recognize the concept "Car" and may associate the particular frame with the concept "Car," even if such a concept could not have been determined from the particular frame by itself. In this example, the social-networking system 160 may also associate the particular frame with the concept "Car Explosion."

In particular embodiments, the social-networking system 160 may detect a scene change based on audio associated with the frames in the video. As an example and not by way of limitation, the social-networking system 160 may recognize concepts associated with the frames using a speech- or audio-recognition process that considers audio occurring in the video near the frames. For example, the social-networking system 160 may analyze audio surrounding a particular frame to determine concepts associated with the particular frame (e.g., recognizing the voice of a particular person and associating the particular frame with that particular person, recognizing a particular sound effect of a gunshot and associating the particular frame with the concept "Gun," recognizing the words "captain America" being spoken by a character and associating the particular frame with the concept "Captain America"). As described herein, the social-networking system 160 may use changes in these concepts as a basis for detecting a scene change between frames. As another example and not by way of limitation, the social-networking system 160 may detect a scene change when there is a shift in the type of audio around a particular frame (e.g., the beginning of a song may signify the beginning a new scene).

In particular embodiments, the social-networking system 160 may limit the number of keyframes that may be selected for a video, so that not every new scene of the video gets a keyframe. As an example and not by way of limitation, the social-networking system 160 may select a maximum of twenty keyframes for a video. This may promote efficiency (e.g., by limiting the number of keyframes that need to be indexed by the social-networking system 160 or cached by the first user's client system 130, as described herein). It may also help make the preview more meaningful for the first user by presenting the first user with only the most noteworthy frames (rather than overwhelming the first user with a frame from every single scene). In particular embodiments, the selection of the keyframes may be based on one or more concepts recognized in frames using image recognition. As an example and not by way of limitation, the social-networking system 160 may select for frames associated with concepts for which users in general may have a high level of interest (e.g., a frame depicting an explosion, a frame depicting a face, a frame depicting an important character, a frame depicting a dog, etc.). The social-networking system 160 may determine the level of interest users may have for concepts based on information from human evaluators (e.g., based on a curated list of interesting concepts), user affinities on the online social network, and/or any other suitable information. By way of a contrasting example and not by way of limitation, the social-networking system 160 may not select less interesting frames (e.g., a frame depicting a landscape, a frame depicting a blank screen, a frame depicting the green rating splash screen commonly displayed at the beginning of movie trailers, etc.). Building on these examples, a frame that includes a face may be selected as a keyframe over a frame that includes a landscape, even though the landscape may have been the first good-quality frame in a particular scene. As another example and not by way of limitation, the social-networking system 160 may select for frames associated with concepts that have a relatively low prevalence in comparison with the other frames in the video. In this example, for a Batman movie trailer, the social-networking system 160 may select a frame associated with a surprise appearance of Wonder Woman over a frame showing Batman, because there may be a relatively large number of frames in the video that are associated with Batman and a relatively small number of frames associated with Wonder Woman. This may serve to promote, as keyframes, those frames that are relatively diverse in comparison to other frames in the respective video. For a similar purpose, in particular embodiments, the social-networking system 160 may select for frames that are diverse in their colors, contrasts, and/or other visual features. As an example and not by way of limitation, in a set of frames that are mostly black-and-white, the social-networking system 160 may select for a frame that is in color. In particular embodiments, the social-networking system 160 may select for keyframes that correspond to scenes of relatively long durations in the video. As an example and not by way of limitation, the social-networking system 160 may select a keyframe from a five-minute scene over a keyframe from a five-second scene. In particular embodiments, the social-networking system 160 may select keyframes based on levels of user engagement (e.g., likes, comments, etc., of users of the online social network) or view-count associated with the time-point in the video or a scene in the video from which the keyframe is taken. As an example and not by way of limitation, the social-networking system 160 may register the time-points or scenes at which users liked or commented on the video. In this example, the social-networking system 160 may associate user likes and/or comments with frames surrounding their respective time-points to determine which frames have the highest user engagement. As another example and not by way of limitation, the social-networking system 160 may associate user likes and/or comments with frames based on explicit user-specified associations to a time-point or scene that is liked or commented (e.g., a user comment may specify "cool explosion at 0:58"). As another example and not by way of limitation, the social-networking system 160 may associate a like or comment that is determined to implicitly reference a time-point or scene of the video (e.g., a comment that states "cool explosion," which may be associated with one or more keyframes in which an explosion occurs). As another example and not by way of limitation, the social-networking system 160 may tally the number of times a frame has been viewed by users to determine which frames have the highest view-count. In particular embodiments, user engagement or view-times may be normalized based on the location of the scene in the video sequence (e.g., to correct for bias toward the beginning of the video, which may be more likely to be viewed or engaged with by users due to the sequential nature of videos). In particular embodiments, the social-networking system 160 may select keyframes among a set of frames based on the relative visual quality of the respective frames. As an example and not by way of limitation, the social-networking system 160 may select a frame that is of a relatively high visual quality over a frame that is of a relatively low visual quality.

In particular embodiments, the social-networking system 160 may calculate, for each keyframe of each identified video, a keyframe-score. The keyframe-score may be a score that indicates a level of interest the first user may have for the respective keyframe among the set of retrieved keyframes. In particular embodiments, a relatively high keyframe-score may indicate a relatively high level of interest, while a relatively low keyframe-score may indicate a relatively low level of interest. In particular embodiments, the keyframe-score may be based on one or more of the factors described herein that are used to select for keyframes. As an example and not by way of limitation, the keyframe-score may be based on a prevalence of the one or more concepts associated with the keyframe. The prevalence of each of the concepts associated with a particular keyframe of a particular identified video may be determined with reference to the one or more concepts associated with each other keyframe in the set of retrieved keyframes for the particular identified video. As an example and not by way of limitation, the social-networking system 160 may calculate a relatively high keyframe-score for keyframes associated with concepts that are relatively less prevalent in the set of retrieved keyframes, and in doing so, may promote diversity in the keyframes. As another example and not by way of limitation, the social-networking system 160 may promote diversity by calculating a relatively high keyframe-score for keyframes that have relatively less prevalent colors, contrasts, and/or other visual features. In particular embodiments, the keyframe-score may be based on levels of user engagement (e.g., likes, comments, etc.) associated with the scene from which the keyframe is taken, as described herein. As an example and not by way of limitation, the social-networking system 160 may calculate a relatively high keyframe-score for a keyframe that has a relatively high level of user engagement. In particular embodiments, the keyframe-score may be based on a view-count of the keyframe. As an example and not by way of limitation, a keyframe that is viewed relatively frequently by users watching the respective video (e.g., a frame contained in a portion of a video depicting a fight scene between the characters Batman and Superman that users frequently replay) may receive a relatively high keyframe-score. The social-networking system 160 may may correct for biases that exist toward the beginning of videos (e.g., people may tend to view or engage with the beginning of a video more than the end, due to the sequential nature of videos) by normalizing the levels of user engagement or view-time appropriately. In particular embodiments, the keyframe-score may be based on the level of interest that users in general have for concepts in the respective keyframe. Although this disclosure describes calculating a particular type of score for particular frames of videos in a particular manner, it contemplates calculating any suitable score for any suitable items in any suitable manner.

In particular embodiments, the keyframe-score may be personalized for the first user. In particular embodiments, this personalization may be based on information associated with the first user that may indicate that certain keyframes may be particularly optimal for the first user. As an example and not by way of limitation, the keyframe-score may be based on one or more affinities the first user has for one or more concepts associated with the respective keyframe. For example, a keyframe depicting a picture of a dog may receive a higher keyframe-score than a keyframe depicting a picture of a cat for a first user who has a higher affinity for dogs than cats (e.g., as determined by the first user's profile information indicating a preference for dogs, history of posting content associated with dogs as compared to cats, history of liking or commenting on content associated with dogs as compared to cats, history of searches with terms associated with dogs as compared to cats). As another example and not by way of limitation, the keyframe-score may be based on other social-graph information such as degrees of separation between the first user and the users or concepts associated with the respective keyframe. For example, in a high school reunion video, a keyframe depicting a first-degree connection of the first user may receive a higher keyframe-score than a keyframe depicting a person who is not a first-degree connection of the first user. As another example and not by way of limitation, the keyframe-score may be based on demographic information associated with the first user (e.g., as determined based on profile information of the first user). For example, for a superhero movie trailer, a keyframe depicting a teenage superhero may receive a higher score than a keyframe depicting an older superhero if the first user is a teenager (e.g., because the teenager first user may relate more to the teenage superhero than to the older superhero, and may consequently be more interested in seeing the former rather than the latter in a keyframe). In particular embodiments, the personalization may be based on a current situational context. As an example and not by way of limitation, the keyframe-score may be based on the current date or time (i.e., the time at which the keyframes are to be displayed to the first user). In this example, a particular keyframe may receive a relatively high keyframe-score if it has one or more concepts that match one or more concepts associated with the date or time, or if it has concepts that are pre-determined to be particularly relevant to a particular date or time. For example, certain keyframes may receive a higher keyframe-score at night than during the day (e.g., keyframes with concepts that are associated with night-time may receive a higher keyframe-score when it is night-time for the first user than when it is day-time for the first user). Similarly, certain keyframes may receive a higher keyframe-score on particular dates (e.g., Christmas Day, Valentine's Day) than on other dates. As another example and not by way of limitation, the keyframe-score may be based on current events. For example, in a video about natural disasters, a keyframe that is associated with the concept "Earthquake" may receive a relatively high keyframe-score when there has been an earthquake recently (e.g., as determined by an online index, database, or news source) or if the topic "Earthquake" is trending on the online social network.

In particular embodiments, the keyframe-score may be based on the relevance of the concepts present in the keyframe with respect to the purpose for which the video is retrieved. As an example and not by way of limitation, if an Avengers video is retrieved in response to a search query that includes the n-gram "captain America" (e.g., referencing FIG. 4, the search query for "avengers trailer captain America" in the search field 410) a keyframe including an image of the character Captain America may receive a higher keyframe-score than a keyframe including an image of the character Iron Man (e.g., because the concept "Captain America" may match the n-gram "captain America" in the search query). As another example, if a sports-highlights video is retrieved for display within a page of a boxing group on the online social network (e.g., when the first user visits the page of the boxing group), a keyframe associated with the concept "Boxing" may receive a higher keyframe-score than a keyframe related to the concept "Soccer."

In particular embodiments, the keyframe-score may be based on a history of interactions other users have had with the respective video that indicate user interest in the contents depicted in the respective keyframe. As an example and not by way of limitation, a keyframe that users frequently view last before deciding to view the video may receive a relatively high keyframe-score. As another example and not by way of limitation, a keyframe that users view for a relatively long duration (e.g., in the case where users are able to submit inputs that can pause a keyframe that is being displayed, as described herein) may receive a relatively high keyframe-score. In these examples, the social-networking system 160 may correct for biases that exist toward the beginning of videos (e.g., people may tend to view or interact with the beginning of a video more than the end, due to the sequential nature of videos) by normalizing the data on the history of interactions appropriately. In particular embodiments, an entity may be able to request for the promotion of particular keyframes (e.g., by sponsoring or paying for the privilege), in which case the social-networking system 160 may adjust the keyframe-score of the particular keyframes upward. The promoting of keyframes may be localized to subgroups of users (e.g., targeting certain demographics, locations, etc.). As an example and not by way of limitation, the marketing team for an Avengers movie may request that a keyframe depicting the character Captain America be promoted in the Avengers trailers viewed in the United States, while a keyframe depicting the character Iron Man be promoted in the same trailers elsewhere (e.g., because Captain America may have a relatively large following in the United States, but not elsewhere). In particular embodiments, keyframes-scores of keyframes that contain explicit content may be adjusted downward. This adjustment downward may only occur for certain demographics, locations, etc. There may be different degrees of adjustment, depending on the demographics, locations, etc. As an example and not by way of limitation, keyframes with explicit content may be severely adjusted downward for users who are not certified to be above a threshold age, and may only slightly adjusted downward for users above the threshold age. In particular embodiments, the keyframe-score may be calculated based on one or more suitable functions that may use, at least in part, any combination of the factors described herein as one or more inputs. The different factors or the different functions used to calculate the keyframe-score may be weighted (using one or more weights which may be, for example, multiplicative factors and/or additive terms) in any suitable manner (e.g., affording higher weight to factors or functions that are better predictors of the level of interest of the first user). As an example and not by way of limitation, the calculation of the keyframe-score may be represented at a high level by the following simplified equation: keyframe-score=$f_\alpha(Af_1(x, y, \ldots)+Bf_2(i, j, \ldots)+ \ldots)$, where A and B are weights; $f_\alpha$, $f_1$, and $f_2$ are functions; and x, y, i, and j are four of the factors that serve as inputs. This equation is only for illustrative purposes. Any suitable means of calculating the keyframe-score based on the factors described herein may be employed.

Figure 6:
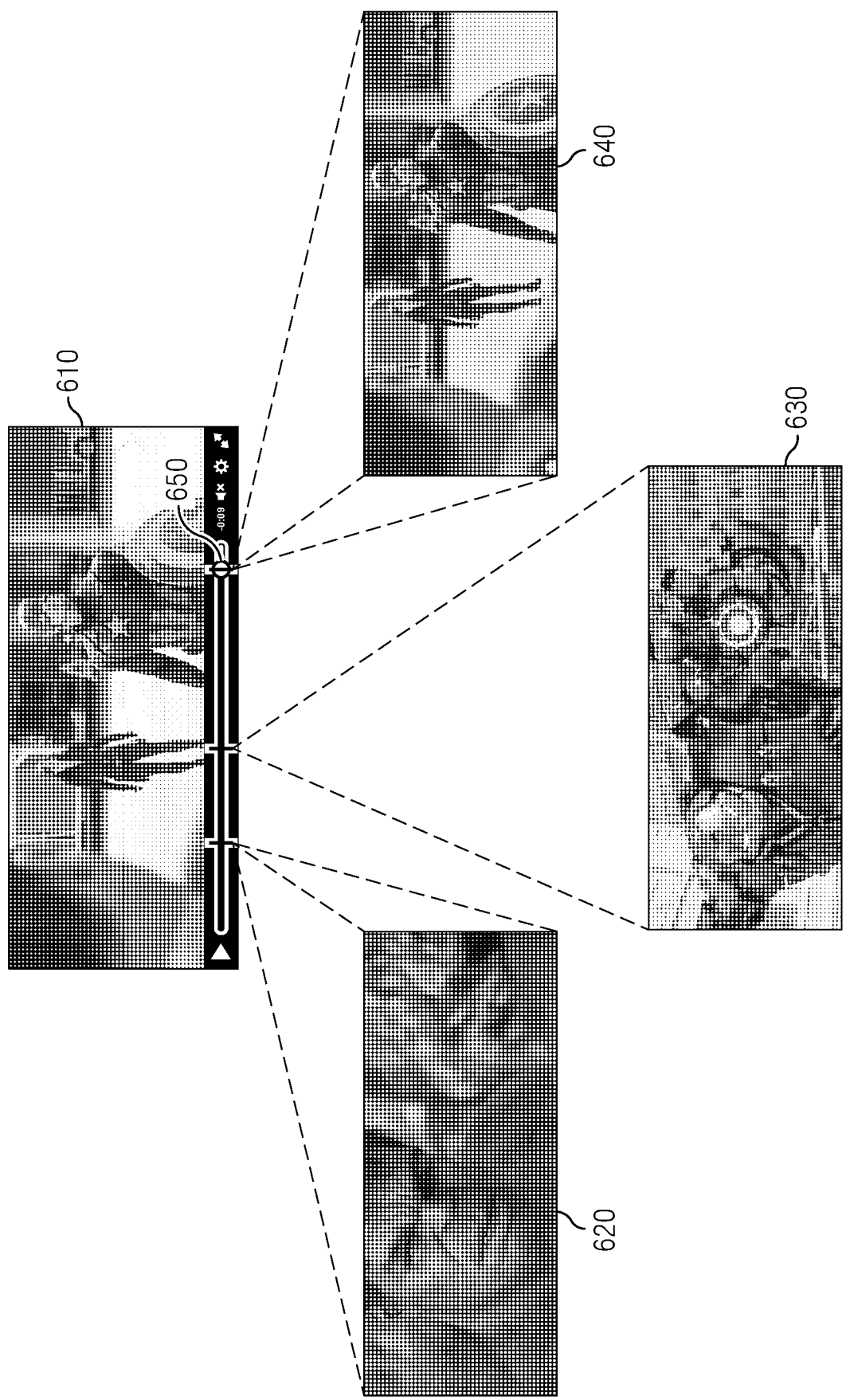
FIG. 6 illustrates an example set of optimal keyframes for a video.
Figure 7:
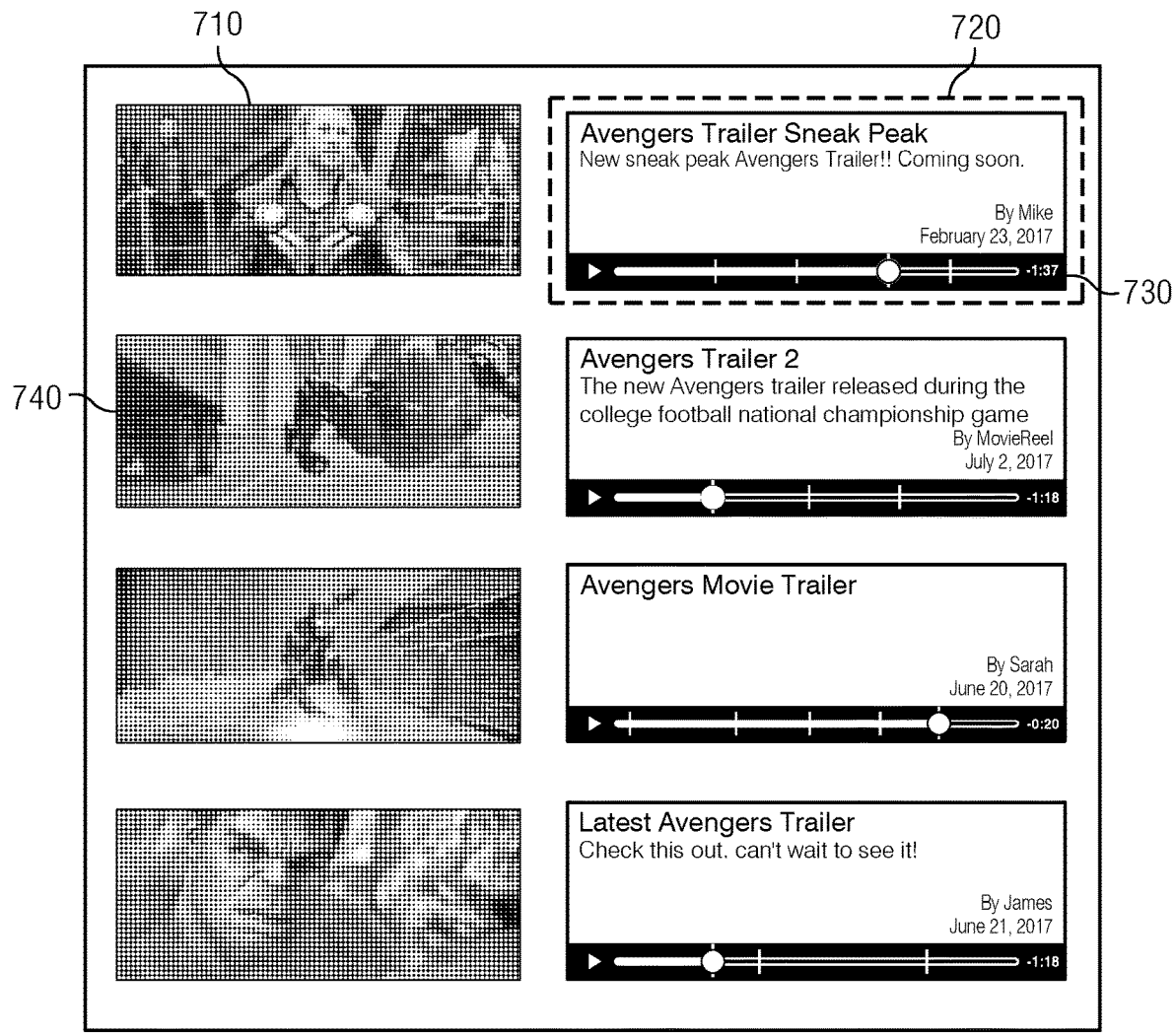
FIG. 7 illustrates an example search-results interface that displays video search results.

FIG. 6 illustrates an example set of optimal keyframes for a video. FIG. 7 illustrates an example search-results interface that displays video search results. In particular embodiments, the social-networking system 160 may send, to the client system 130 of the first user for display, a search-results interface that includes one or more search results corresponding to one or more of the identified videos (e.g., by sending information configured to render such a search-results interface). As an example and not by way of limitation, FIG. 4 and FIG. 7 depict two such search-results interfaces. In particular embodiments, one or more of the search results may be communications (e.g., posts, reshares, private messages addressed to the first user, etc.) on the online social network that include a video that is responsive to the search query. As an example and not by way of limitation, referencing FIG. 4, the search results 430 and 440 may be posts from a user and a non-user entity, respectively, that include a video responsive to the search query in the search field 410 (e.g., "avengers trailer captain America"). In particular embodiments, one or more of the search results may be content objects that include the respective videos themselves or may include simply links to the respective videos. As an example and not by way of limitation, referencing FIG. 4, the search results within the video-results module 420 may be simply links to the respective videos. As another example and not by way of limitation, the search result 710 may be content objects that include the respective videos themselves. Each search result may include one or more keyframes for the corresponding identified video that may be determined to be "optimal keyframes." The optimal keyframes may be keyframes selected from the set of keyframes for an identified video that have keyframe-scores greater than a threshold keyframe-score. The optimal keyframes of a video, when viewed together, may function as a meaningful preview of the video. In particular embodiments, the keyframe-score and the threshold keyframe-score may be a keyframe-rank and a threshold keyframe-rank, respectively, such that only keyframes above the threshold keyframe-rank may be determined to be optimal keyframes. The social-networking system 160 may use the threshold keyframe-score or the threshold keyframe-rank to impose an upper limit to the number of keyframes that may be selected as optimal keyframes. As an example and not by way of limitation, the social-networking system 160 may specify that only three keyframes with the highest keyframe-scores, or the three top-ranked keyframes may be selected as optimal keyframes. For example, out of the seven keyframes of the video 510 in FIG. 5, the social-networking system 160 may select as optimal keyframes the three keyframes depicted in FIG. 6 (i.e., optimal keyframes 620, 630, and 640). By selecting for the highest-scoring or highest-ranked keyframes (e.g., keyframes with keyframe-scores greater than a threshold keyframe-score), the social-networking system 160 may select for the keyframes that reflect the moments in the video that best summarize the video (e.g., by providing the most representative frames). Additionally or alternatively, selecting such keyframes may promote keyframes that are interesting to the querying user are presented, thus piquing the querying user's interest in the respective video. Alternatively or additionally, selecting such keyframes may ensure that diverse keyframes are selected, thus piquing the querying user's interest in video content or video search generally (e.g., by showing the breadth of available content in one or more videos). Although this disclosure describes sending particular types of search-results interfaces to a particular system in a particular manner, it contemplates sending any suitable types of search-results interfaces to any suitable system in any suitable manner. Furthermore, although this disclosure describes sending particular keyframes to a particular system in a particular manner, it contemplates sending any suitable frames of videos to any suitable system in any suitable manner.

The number of optimal keyframes that may be selected may be varied across different videos (e.g., by adjusting the upper limit or the threshold keyframe-rank/threshold keyframe-score). Such variance may be based on any suitable factors. As an example and not by way of limitation, the number of optimal keyframes of a video may be based on the length of the video (e.g., allowing for a relatively large number of optimal keyframes for a relatively long video). As another example and not by way of limitation, the threshold-rank or threshold-score of a video may be based on the diversity of the keyframes of the video (e.g., allowing a relatively large number optimal keyframes to be selected for a video with relatively diverse keyframes).

In particular embodiments, the optimal keyframes may be displayed within a preview region on the search-results interface. In particular embodiments, each video search result may have an associated preview region that displays optimal keyframes from the respective video. The preview region may be located adjacent to, near to, or directly over the region where a video is displayed. As an example and not by way of limitation, referencing FIG. 5, the preview region may be located directly over a thumbnail display of the video (e.g., such that perceptually at least, the preview region is not a region separate from the thumbnail display). In particular embodiments, the social-networking system 160 may display a timeline for the video that visually depicts the time-points at which the different optimal keyframes occur in the video. The timeline may be displayed in any suitable region of the screen (e.g., near to, adjacent to, or directly overlaying a portion of the preview region). As an example and not by way of limitation, referencing FIG. 4, the timeline 450 may be overlaid on a bottom portion of the preview region. In this example, the time-points at which the different optimal keyframes occur in the video corresponding to the search result 430 may be tagged with a visual marker (e.g., the visual marker 460). The use of such visual markers to depict the time-points at which different optimal keyframes occur is further illustrated in FIG. 6, which shows how the time-points of each of the optimal keyframes for the video 610 (i.e., the optimal keyframes 620, 630, and 640) are depicted on a respective timeline with respective visual markers. In particular embodiments, a time-point on the timeline for an optimal keyframe that is currently displayed in the preview region may be visually distinguished from the other optimal keyframes (e.g., by use of a separate indicator for the time-point corresponding to the currently displayed optimal keyframe, highlighting the visual marker corresponding to the currently displayed optimal keyframe). As an example and not by way of limitation, referencing FIG. 4, the indicator 470 may be overlaid on top of the visual marker corresponding to the currently displayed optimal keyframe, indicating that the optimal keyframe corresponding to that visual marker is currently being displayed. Using the timeline information, the first user may be able to visually track the occurrence of the different optimal keyframes in the video as they are being displayed.

In particular embodiments, the optimal keyframes for an identified video may be displayed in the preview region in a slideshow preview mode or in an interactive preview mode. In a slideshow preview mode, the preview region of a video may display the optimal keyframes of the video as a slideshow by proceeding through each of the optimal keyframes automatically. In particular embodiments, the optimal keyframes may be displayed for different time durations based on their relative keyframe-scores. As an example and not by way of limitation, a keyframe with a relatively high keyframe-score may be displayed for a relatively long duration (e.g., 1 second), while a keyframe with a relatively low keyframe-score may be displayed for a relatively short duration (e.g., 0.5 seconds). In particular embodiments, the slideshow may begin when the preview region is rendered on the search-results interface and may continue indefinitely (e.g., cycling through the optimal keyframes in a defined order). Alternatively, the slideshow may start and stop in response to one or more user inputs. As examples and not by way of limitation, the slideshow may start when the first user hovers over the thumbnail with a cursor, hovers over an associated screen region with a finger or other pointer object (e.g., as determined by proximity sensors or a camera), taps or holds down on the associated screen region, or in any other way indicates an interest in the respective video. In these examples, the slideshow may stop when the first user stops hovering over the thumbnail, stops hovering over an associated screen region with a finger or other pointer object, stops holding down on the associated screen region, or taps the associated screen region again, or in any other way indicates an intent to stop the slideshow. In particular embodiments, the slideshow preview mode may include a display of a timeline that includes a display of visual markers indicating the time-points of the respective video's optimal keyframes and an indicator that indicates the currently displayed optimal keyframe (e.g., referencing FIG. 4, the indicator 470) that moves from one optimal keyframe to the next as the currently displayed optimal keyframe changes during the slideshow.

In particular embodiments, the optimal keyframes may be displayed in the preview region in an interactive preview mode. The interactive preview mode may allow the first user to more precisely control the display of the optimal keyframes in the preview region. In particular embodiments, the interactive preview mode may allow a user to navigate forward or backward through an ordered set of optimal keyframes using suitable inputs. In particular embodiments, the interactive preview mode may present the first user with a timeline-scrubber element at a suitable location (e.g., overlaying the respective video, adjacent to the respective video). As an example and not by way of limitation, referencing FIG. 4, the preview region for the search result 430 may include the timeline-scrubber element 450 (within the dashed-line box). The timeline-scrubber element may include a display of a timeline of the respective video and a moveable scrubber component that may be adjusted by the first user with an appropriate input. The timeline may include a display of visual markers indicating the time-points of the respective video's optimal keyframes. In these embodiments, the first user may be able to navigate through the optimal keyframes by adjusting the position of the moveable scrubber component to a location associated with the desired optimal keyframe (e.g., over the location of the respective visual marker). As an example and not by way of limitation, referencing FIG. 6, the moveable scrubber element 650, currently positioned over the location of the visual marker for the optimal keyframe 640, may be re-positioned to be over the location of either of the other visual markers on the timeline (i.e., that of the optimal keyframe 620 or of the optimal keyframe 630). In particular embodiments, the moveable scrubber element may jump from one keyframe to the next (e.g., sequentially in the intended direction) as the first user submits inputs to re-position it. In re-positioning the moveable scrubber element, any of one or more suitable input means may be made available to the first user. As an example and not by way of limitation, the first user may be able to click and drag (or press and drag on a touchscreen) the moveable scrubber element in an intended direction, click (or press) suitable buttons on the display (e.g., a left- or right-arrow button, an up- or down-arrow key, etc.), press suitable keys on an input device (e.g., a left- or right-arrow button, an up- or down-arrow button, etc.), any other suitable interactive elements presented on the display, or any combination thereof. As another example and not by way of limitation, the first user may be able to press a "right" arrow key to proceed to the next keyframe in a sequence or to start an automatic slideshow in that direction, and may press a "left" arrow key to proceed in the reverse direction. These means of input may be positioned in any suitable location on the search-results interface (e.g., adjacent to the preview region as in FIG. 7, overlaying the preview region as in FIG. 4). The interactive preview mode may also allow for other types of input such as gestures (e.g., 3D gestures, tilt gestures, touch gestures, etc.) or other methods of scrolling through the optimal keyframes (e.g., using a scroll-wheel on a mouse). As an example and not by way of limitation, referencing FIG. 6, the first user may be able to tilt the client system 130 on which the preview is being presented to the left to re-position the moveable scrubber element to the left of its current position (e.g., causing it to jump to the location of the visual marker for the optimal keyframe 630). As another example and not by way of limitation, referencing FIG. 6, the first user may be able to swipe left on a touch screen of the client system 130 to re-position the moveable scrubber element to the left of its current position. The directionality may not be limited to horizontal directions. As an example and not by way of limitation, the inputs may correspond to vertical directions (e.g., particularly when the timeline is oriented in a vertical manner) or other directions. In particular embodiments, a timeline-scrubber element may not be displayed to the first user. In these embodiments, the first user may still proceed through the optimal keyframes using one or more suitable inputs described herein (e.g., by performing a suitable swiping gesture).

In particular embodiments, the social-networking system 160 may allow the first user to activate an enlarged preview mode, where the preview is displayed within an enlarged preview region, which may be a larger portion of the screen (e.g., a full-screen display) than the standard preview region that is initially displayed to the first user. In particular embodiments, the enlarged preview mode may be activated when the first user submits an input indicating an intent for such activation (e.g., pressing and holding a suitable region on a touchscreen, clicking a designated interactive element). The enlarged preview mode may be either of a slideshow-type or of an interactive-type as described herein. In particular embodiments, when the enlarged preview mode is activated, the social-networking system 160 may send higher-resolution images of the optimal keyframes to the client system 130 of the first user for display within the enlarged preview region. In particular embodiments, the client system 130 of the first user may treat the activation of the enlarged preview mode as a trigger for pre-caching the entire video or segments thereof (e.g., the scene that includes the currently displayed optimal keyframe, one or more scenes that occur after the time-point of the currently displayed optimal keyframe, etc.). The client system 130 of the first user may accordingly request and receive video information from the social-networking system 160 for pre-caching the video or segments thereof. Upon receiving the video information, the client system 130 of the first user may cache it in a local data store for easy retrieval should the first user submit a further input specifying that the video be played back.

In particular embodiments, the optimal keyframes for a respective video may be ordered by the social-networking system 160 based on any of one or more suitable factors. As an example and not by way of limitation, the order may be based on the chronological order of appearance of the optimal keyframes in the respective video. As another example and not by way of limitation, the order may be based on the relative keyframe-scores of the optimal keyframes (e.g., ordering the highest. The display of the optimal keyframes may be based on their determined order. As an example and not by way of limitation, in the slideshow preview mode, the preview area may display the optimal keyframes sequentially in their respective order. As another example and not by way of limitation, in the interactive preview mode, the first user may proceed through the optimal keyframes in their respective order. In particular embodiments, the social-networking system 160 may initially display the optimal keyframe with the highest keyframe-score and yet retain the order of the optimal keyframes in chronological order. As an example and not by way of limitation, referencing FIG. 4, the social-networking system 160 may initially display the optimal keyframe corresponding to the time-point at the location of the indicator 470 (i.e., the currently displayed optimal keyframe) because it may have the highest keyframe-score. In this example, in a slideshow preview mode, the next optimal keyframe displayed would be the optimal keyframe corresponding to the time-point at the location of the visual marker 460 and then proceed to the next optimal keyframe, in chronological order.

In particular embodiments, the methods described herein for determining and displaying optimal keyframes may be employed outside the user-search-query context. Optimal keyframes may be determined and displayed to the first user in other situations where a video is presented to the first user (whether or not the first user has submitted any search query for videos). As an example and not by way of limitation, optimal keyframes may be determined and displayed for one or more videos that are to appear on a newsfeed interface of a user or any other suitable interface that is to be presented to the first user (e.g., a profile page of an entity, a group page with videos related to the purpose of the group, a page including a set of videos, etc.). As another example and not by way of limitation, optimal keyframes may be determined and displayed for a video that is sent to a user as part of a communication from another entity (e.g., a video that is part of a private message to the first user).

Figure 8A:
FIGS. 8A and 8B illustrate an example of a preview-mode interface and an example of a playback-mode interface, respectively.
Figure 8B:

FIGS. 8A and 8B illustrate an example of a preview-mode interface and an example of a playback-mode interface, respectively. The transition may also happen in reverse. In particular embodiments, the first user may be able to transition from one of the preview modes to a playback mode of the respective video (i.e., causing the video to be played on the client system 130 of the first user). As an example and not by way of limitation, referencing FIGS. 8A and 8B, the preview 810 may transition to the playback interface 820 (e.g., a full-screen interface), which may play the corresponding video. As another example and not by way of limitation, the preview 810 may transition to a playback interface within the same region displaying the preview 810 (e.g., the playback interface may occupy the same region as the preview 810). In particular embodiments, the transition may occur in response to the occurrence of a trigger event indicating that the first user may be interested in viewing the video. In particular embodiments, the trigger event may be associated with a particular optimal keyframe, in which case the playback of the video may begin at or near the time-point corresponding to the particular optimal keyframe, or at or near the time-point corresponding to a scene that contains the particular optimal keyframe. As an example and not by way of limitation, referencing FIG. 8A, a trigger event associated with the currently displayed optimal keyframe in the preview 810 may be detected. In this example, referencing FIG. 8B, the social-networking system 160 may initiate playback of the respective video from the time-point corresponding to the same optimal keyframe in the playback interface 820. In particular embodiments the playback of a video may begin at a scene that is associated with (or a scene that includes a keyframe associated with) concepts that the social-networking system 160 may determine to be particularly relevant to the first user's intent in choosing to view the video. As an example and not by way of limitation, if the video was retrieved in response to a search query for "avengers trailer captain America," playback may begin with a scene that features the character Captain America. In particular embodiments, the trigger event may be the occurrence of an input from the first user that indicates an interest in viewing the video or a segment thereof. As an example and not by way of limitation, referencing FIG. 8A, the input may include pressing the "play" button displayed on the preview 810. As another example and not by way of limitation, the trigger event may include the first user expressing an interest in a particular optimal keyframe (e.g., clicking on the particular optimal keyframe, hovering over the particular optimal keyframe with a finger or a cursor for a threshold period of time, pausing the preview at a particular optimal keyframe for a threshold period of time by positioning and holding a moveable scrubber element at the respective location with a finger or a cursor for the threshold period of time, performing a force-touch on a touchscreen with sensors that can detect an amount of force applied by a user, etc.). For example, referencing FIG. 8A, the first user may have positioned the scrubber over the visual marker corresponding to the currently displayed optimal keyframe for a threshold period of time (e.g., five seconds), in response to which a video playback may be initiated (e.g., playing the video within the same region displaying the preview 810, transitioning to the playback interface 820 and playing the video therein, etc.).

In particular embodiments, the social-networking system 160 may respond to detecting the occurrence of a pre-trigger event. A pre-trigger event may be an event that indicates a likelihood that a trigger event will occur. As an example and not by way of limitation, in the case where a trigger event occurs when the first user submits an input to pause the preview at a particular optimal keyframe for five seconds, a pre-trigger event may occur when the first user pauses the preview at the particular optimal keyframe for two seconds. In particular embodiments, in response to detecting the occurrence of a pre-trigger event, the social-networking system 160 and the client system 130 of the first user may take one or more actions to prepare to respond to an occurrence of a trigger event (should it occur). As an example and not by way of limitation, building on the previous example, when the first user pauses the preview at a particular optimal keyframe for two seconds, the social-networking system 160 may begin sending video content (e.g., for playing the entire video, a segment of the video corresponding to the scene associated with the currently displayed optimal keyframe, one or more segments of the video following the time-point associated with the currently displayed optimal keyframe, etc.) to the client system 130 of the first user, which may begin caching the video content in a local data store. In this example, when a trigger event is subsequently detected (e.g., if the first user continues to pause the preview at the particular optimal keyframe for a total of five seconds), video playback may be initiated.

In particular embodiments, the social-networking system 160 may display the optimal keyframes to a first user during playback of a respective video. The first user may be able to, while watching the video, anticipate when noteworthy portions of a video (e.g., portions associated with an optimal keyframe) are going to occur and/or navigate through the video from a time-point associated with one optimal keyframe to a time-point associated with the next. As an example and not by way of limitation, referencing FIG. 8B, the time-points corresponding to optimal keyframes may be depicted within a timeline-scrubber element that may be viewed by the first user as the video is being played in the playback interface 820. In this example, the first user may be able to submit suitable inputs to navigate through the video by skipping among the different the time-points of the optimal keyframes. The ability to view and navigate through time-points of the optimal keyframes may be useful in searching though the content of a video. As an example and not by way of limitation, the first user may want to locate a particular scene in a long video and may navigate through the keyframes to find the particular scene. As another example and not by way of limitation, the first user may browse through the keyframes for a scene that may be of interest to the first user.

In particular embodiments, one or more descriptions associated with one or more of the optimal keyframes or the scenes from which they were taken may be displayed at a suitable location. As an example and not by way of limitation, referencing FIG. 8B, the social-networking system 160 may display a description for each of the optimal keyframes at a location adjacent to the respective optimal keyframe (e.g., the descriptions "Captain America, fight," "Hulk, smash," and "Avengers battle, explosions," for the first, second, and third optimal keyframes, respectively). In particular embodiments, the description may be based on one or more n-grams extracted from one or more communications (e.g., posts, reshares, comments on the online social network) associated with a portion of the corresponding video that contains the respective optimal keyframe. As an example and not by way of limitation, in determining the description for an optimal keyframe, the social-networking system 160 may extract n-grams (following a TF-IDF analysis and other pre-processing tasks) from communications that are associated with the time-point or scene from which the optimal keyframe is taken (e.g., the n-grams from the comment "love that Hulk smash" comment posted for the video at around the time-point when the optimal keyframe occurs in the video, the n-grams from a post including the video that reads "captain America fight scene at 0:21 is amazing!"). In this example, the social-networking system 160 may compile and rank n-grams extracted from all such communications associated with each optimal keyframe and may select, as a description of the optimal keyframe, the one or more n-grams that occur most frequently in communications associated with the optimal keyframe. In particular embodiments, the social-networking system 160 may translate media items (e.g., emojis, stickers) present in communications associated with time-points into n-grams using a media index that indexes media items with n-grams that are frequently used in conjunction with the respective media items (e.g., in communications on the online social network), and may then extract those n-grams in determining the descriptions for optimal keyframes. As an example and not by way of limitation, the social-networking system 160 may translate the comment "great ☺ " into the n-gram "great smile" and/or the n-gram "great happy." More information on translating media items into n-grams using a media index may be found in U.S. patent application Ser. No. 14/952,707, filed 25 Nov. 2015, which is incorporated by reference. In particular embodiments, the description may be based on metadata information describing the scene (e.g., a title of a chapter in the video), descriptions of users or concepts recognized with an image-recognition process or tagged in the video (e.g., "clark kent, daily planet building"; "John A, Mary S, Notre Dame Cathedral"), or any other suitable information. In particular embodiments, the social-networking system 160 may display time-markers that indicate the time-points at which one or more of the optimal keyframes occurs in the respective video may be displayed at a suitable location. As an example and not by way of limitation, referencing FIG. 8B, the social-networking system 160 may display time-markers for each of the optimal keyframes at a location adjacent to the respective optimal keyframe (e.g., the time-markers "0:21," "0:35," and "0:50," for the first, second, and third optimal keyframes, respectively). In particular embodiments, only the descriptions and/or time-markers of a subset of the optimal keyframes of a video may be displayed. As an example and not by way of limitation, referencing FIG. 8A, only the description (e.g., "Hulk, smash") and time-marker (e.g., "0:35") of the optimal keyframe currently being displayed may be displayed. As another example and not by way of limitation, only the description and/or time-marker of one or more optimal keyframes for which the first user has exhibited an interest may be displayed (e.g., displaying the description and/or time-marker of only a particular optimal keyframe as a finger of the first user hovers over the visual marker for that particular optimal keyframe). In particular embodiments, small-scale-versions of the optimal keyframes may be displayed in a suitable display region (e.g., in subregions of the preview region adjacent to the visual markers for respective optimal keyframes). As an example and not by way of limitation, a small-scale-version of a particular optimal keyframe may be displayed when the first user hovers over (e.g., with a cursor, with a finger) the visual marker for the particular optimal keyframe.

In particular embodiments, keyframes may be packaged into a data-efficient format to conserve bandwidth and processor resources (e.g., both on the client side and on the server side) when one or more optimal keyframes are sent to the client system 130 of the first user. As an example and not by way of limitation, the keyframes may be packaged as a lower-resolution version of the corresponding frame in the video. In particular embodiments, one or more keyframes (e.g., the optimal keyframes) of one or more videos (e.g., the identified videos) may be pre-cached at the client system 130 of a user before the one or more videos are to be presented to the first user (e.g., in a search-results interface, on a newsfeed, as part of a communication). As an example and not by way of limitation, the social-networking system 160 may send, to the client system 130 of a user (e.g., the first user), the optimal keyframes of a video as it is sending the video and any other content that is to be rendered along with the video (e.g., as it is sending the information to render the search-results interface depicted in FIG. 4), and the client system 130 of the first user may cache the keyframes in one or more local data stores. Features such as data-efficient packaging and pre-caching, working alone or in tandem, may act to afford users a very responsive, lightweight interactive experience in engaging with videos on the online social network.

In particular embodiments, the search-results interface presented to the first user may have one or more other features that enhance the user experience in interacting with the search results. In particular embodiments, on a search-results interface in which the first user is viewing a preview of a particular video or viewing the playback of the particular video (e.g., on an enlarged preview, or on an enlarged or full-screen playback interface), the first user may be able to switch to another video in the identified set of video search results (e.g., the subsequent video in a ranked list of video search results, a video in the identified set that is most associated with the concepts that are present in a currently displayed optimal keyframe or a keyframe associated with a scene that is currently being played back) by performing a particular gesture or other input (e.g., an upward or downward swipe, a particular tilt gesture, an activation of a particular interactive element on the display). As an example and not by way of limitation, referencing FIG. 7, a first user who is viewing a playback of the video in the search result 710 on a full-screen display may be able to quickly switch to a playback of the video in the search result 740 by swiping downward on a touch-screen of the client system 130. Similarly, in this example, the first user may quickly switch back to a playback of the video in the search result 710 by swiping upward on the touch-screen. In particular embodiments, the social-networking system 160 (or the local client system 130 of the first user) may automatically position or re-position "focal areas" such as areas of visual-focus on a preview or playback interface (e.g., the center of the preview or playback region), or areas of frequent user interaction (e.g., referencing FIG. 4, the area of the timeline-scrubber element 450) in areas that are not likely to be obscured (e.g., by the first user's finger). In particular embodiments, the social-networking system 160 (or the local client system 130 of the first user) may position or re-position areas of visual-focus to a location that is relatively distant from the point of the last user interaction (e.g., re-centering a playback of the video around a point distant from a point where the first user last touched the screen). In particular embodiments, the social-networking system 160 may position or re-position areas of frequent user interaction to a location that is relatively close to the point of the last user interaction (e.g., re-positioning a timeline-scrubber element closer to a point where the first user last touched the screen). In particular embodiments, the social-networking system 160 (or the local client system 130 of the first user) may have an object-tracking feature that is able to use data from the client system 130 to actively track objects that are likely to obscure the first user's view, and may accordingly actively re-position areas of visual focus. As an example and not by way of limitation, the client system 130 of the first user may have a front-facing camera or a proximity sensor that detects a finger hovering over an area of its screen. Such detection may cause the social-networking system 160 or the client-system 130 of the first user to re-position areas of visual focus away from the finger. In particular embodiments, the opposite may be true for areas of frequent user interaction (e.g., causing the re-positioning of a timeline-scrubber element toward the location of a hovering finger, or toward the location of a cursor).

In particular embodiments, information gleaned from keyframes of videos may have uses on the backend in content ranking (e.g., for search). The social-networking system 160 may use information from keyframes as a factor in ranking a list of search results. As an example and not by way of limitation, a video with keyframes that are of a relatively high quality (e.g., keyframes that are relatively diverse, keyframes of relatively high visual quality, keyframes with concepts that are relatively interesting to users, keyframes with concepts of relatively high relevance to a search query) may be ranked higher than a video with keyframes of relatively low quality. Essentially, in this example, the social-networking system 160 may analyze a video's keyframes rather than the video itself to evaluate the video. Evaluating keyframes of a set of videos may be more resource efficient than analyzing every single frame of the videos in the set, and the social-networking system 160 may accordingly use this method as a short-cut mechanism.

Figure 9:
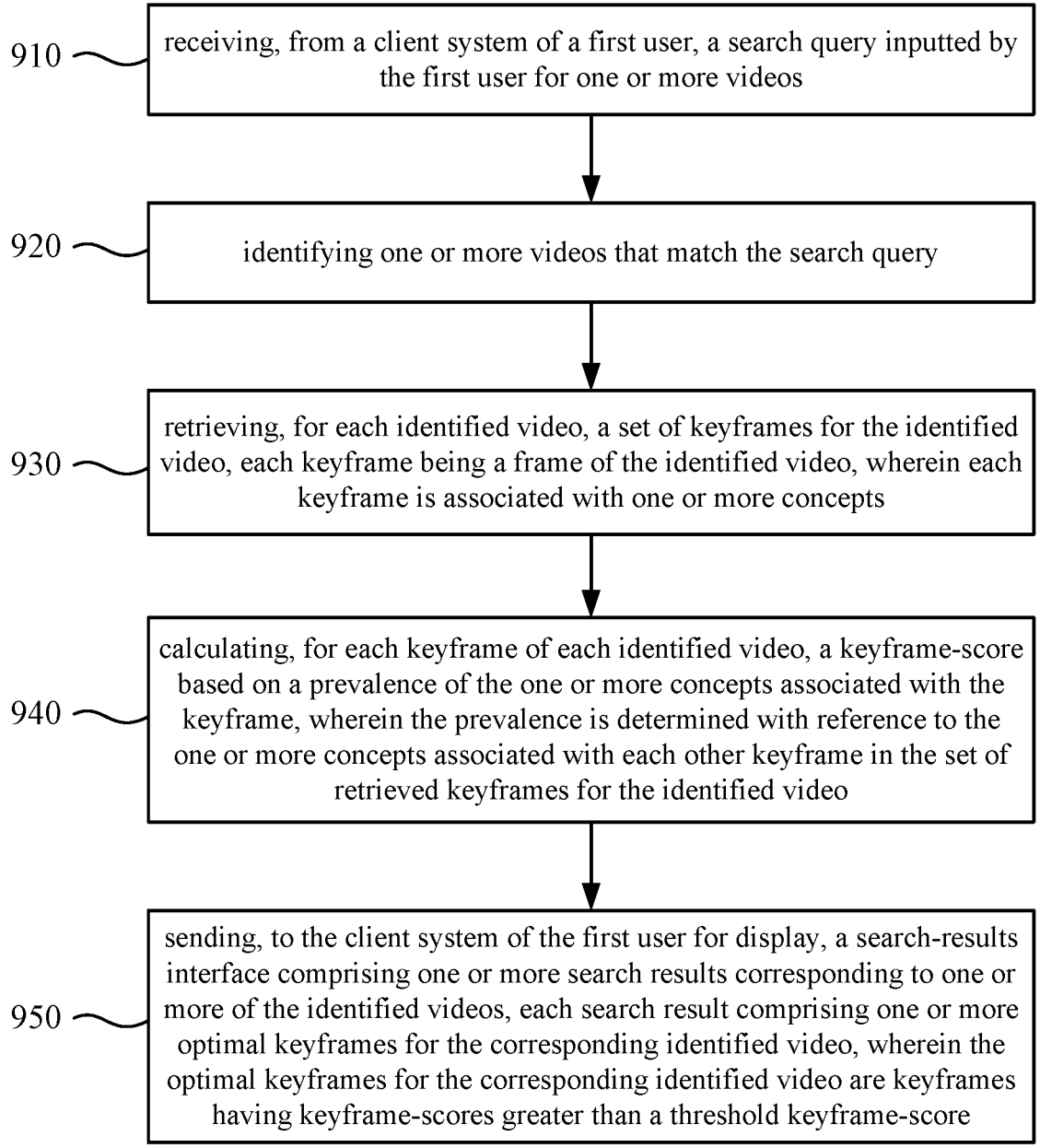
FIG. 9 illustrates an example method for determining keyframes for display in a search-results interface.

FIG. 9 illustrates an example method 900 for determining keyframes for display in a search-results interface. The method may begin at step 910, where the social-networking system 160 may receive, from a client system 130 of a first user, a search query inputted by the first user for one or more videos. At step 920, the social-networking system 160 may identify one or more videos that match the search query. At step 930, the social-networking system 160 may retrieve, for each identified video, a set of keyframes for the identified video, each keyframe being a frame of the identified video, wherein each keyframe is associated with one or more concepts. At step 940, the social-networking system 160 may calculate, for each keyframe of each identified video, a keyframe-score based on a prevalence of the one or more concepts associated with the keyframe, wherein the prevalence is determined with reference to the one or more concepts associated with each other keyframe in the set of retrieved keyframes for the identified video. At step 950, the social-networking system 160 may send, to the client system 130 of the first user for display, a search-results interface comprising one or more search results corresponding to one or more of the identified videos, each search result comprising one or more optimal keyframes for the corresponding identified video, wherein the optimal keyframes for the corresponding identified video are keyframes having keyframe-scores greater than a threshold keyframe-score. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for determining keyframes for display in a search-results interface including the particular steps of the method of FIG. 9, this disclosure contemplates any suitable method for determining keyframes for display in a search-results interface including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile interfaces, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web interfaces, in one or more e-mails, or in connection with search results requested by a user. In addition or as an alternative, an advertisement may be one or more sponsored stories (e.g., a news-feed or ticker item on the social-networking system 160). A sponsored story may be a social action by a user (such as "liking" an interface, "liking" or commenting on a post on an interface, RSVPing to an event associated with an interface, voting on a question posted on an interface, checking in to a place, using an application or playing a game, or "liking" or sharing a website) that an advertiser promotes, for example, by having the social action presented within a pre-determined area of a profile interface of a user or other interface, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results interface, where sponsored content is promoted over non-sponsored content.

In particular embodiments, an advertisement may be requested for display within social-networking-system web interfaces, third-party web interfaces, or other interfaces. An advertisement may be displayed in a dedicated portion of an interface, such as in a banner area at the top of the interface, in a column at the side of the interface, in a GUI within the interface, in a pop-up window, in a drop-down menu, in an input field of the interface, over the top of content of the interface, or elsewhere with respect to the interface. In addition or as an alternative, an advertisement may be displayed within an application. An advertisement may be displayed within dedicated interfaces, requiring the user to interact with or watch the advertisement before the user may access an interface or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) an interface associated with the advertisement. At the interface associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through the social-networking system 160) or RSVP (e.g., through the social-networking system 160) to an event associated with the advertisement. In addition or as an alternative, an advertisement may include social-networking-system content directed to the user. As an example and not by way of limitation, an advertisement may display information about a friend of the user within the social-networking system 160 who has taken an action associated with the subject matter of the advertisement.

Systems and Methods

Figure 10:
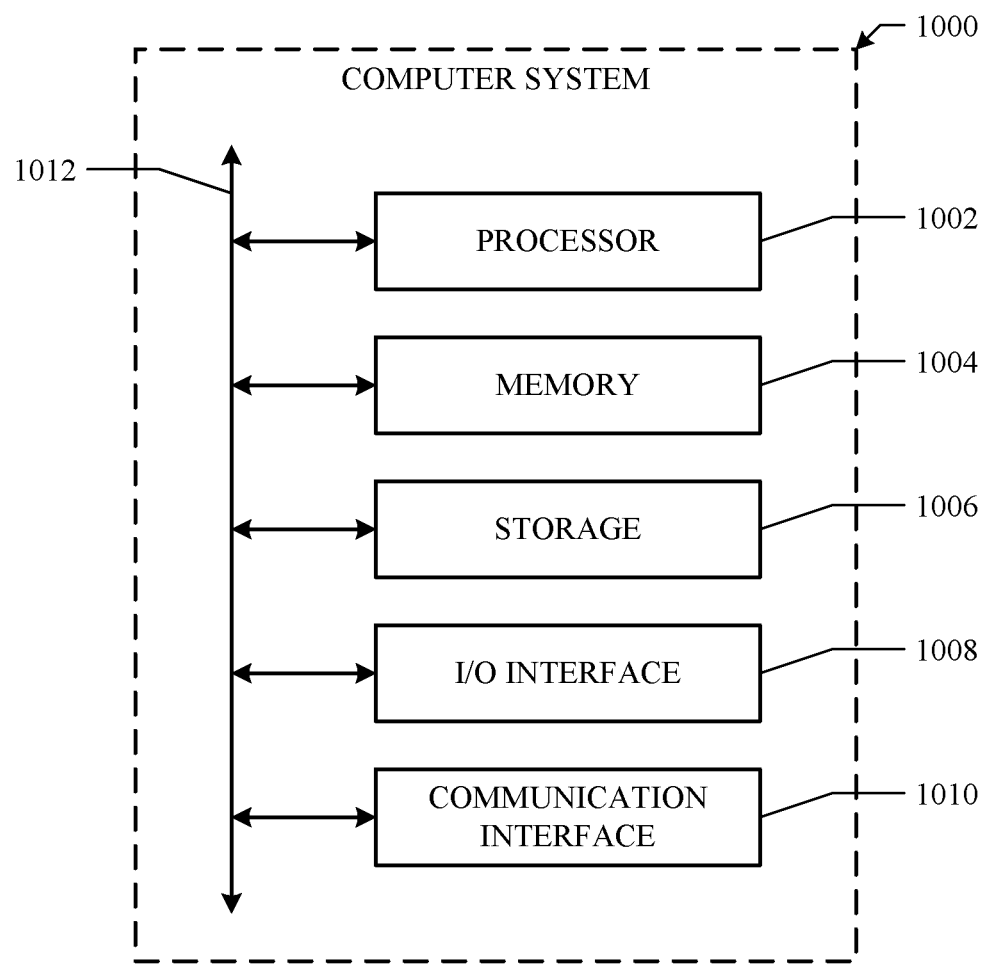
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices:

receiving, from a client system of a first user, a search query inputted by the first user, wherein the search query is associated with one or more concepts;

identifying one or more videos that match the search query;

retrieving, for each identified video, a set of keyframes for the identified video, each keyframe being a frame of the identified video, wherein each keyframe is associated with the one or more concepts associated with the search query;

calculating, for each keyframe of each identified video, a keyframe-score based on a prevalence of the one or more concepts associated with the keyframe, wherein the prevalence is determined with reference to the one or more concepts associated with each other keyframe in the set of retrieved keyframes for the identified video; and sending, to the client system of the first user, instructions for displaying a search-results interface comprising one or more search results corresponding to one or more of the identified videos, wherein each search result is displayed with one or more optimal keyframes for the corresponding identified video, wherein the optimal keyframes for the corresponding identified video are keyframes associated with the one or more concepts associated with the search query and having keyframe-scores greater than a threshold keyframe-score, wherein each of the one or more of the search results comprises a preview region, and wherein the preview region displays the optimal keyframes of the respective search result, the display of the optimal keyframes being based on one or more inputs from the first user.

2. The method of claim 1, further comprising:
accessing a social graph comprising a plurality of nodes and a plurality of edges connecting the nodes, each of the edges between two of the nodes representing a single degree of separation between them, the nodes comprising:
a first node corresponding to the first user; and
a plurality of second nodes corresponding to a plurality of objects, respectively.

3. The method of claim 1, wherein the set of keyframes for a respective identified video is determined based on a keyframe-extraction process that comprises:
detecting one or more scene-changes in the respective identified video; and
extracting, for each of one or more of the scene-changes, a first frame that occurs in the respective identified video during the scene-change as a first keyframe.

4. The method of claim 3, wherein one or more of the scene-changes are detected based on one or more changes in one or more visual features of a plurality of frames in the respective identified video.

5. The method of claim 3, wherein one or more of the scene-changes are detected based on one or more changes in one or more audio features of the respective identified video.

6. The method of claim 1, wherein the keyframe-score is further based on the one or more concepts associated with the search query matching one or more of the concepts associated with the respective keyframe.

7. The method of claim 1, wherein the respective keyframe-score of each keyframe is further based on user engagement associated with a portion of the respective identified video that contains the respective keyframe.

8. The method of claim 1, wherein the respective keyframe-score of each keyframe is further based on information associated with the first user.

9. The method of claim 1, wherein the respective keyframe-score of each keyframe is further based on a current date or time, the current date or time being associated with the one or more concepts associated with the search query that match one or more of the concepts associated with the respective keyframe.

10. The method of claim 1, wherein each of one or more of the search results comprises a preview region, wherein the preview region displays the optimal keyframes of the search result in a slideshow that automatically proceeds through each of the optimal keyframes.

11. The method of claim 10, wherein each of the optimal keyframes is displayed for a duration that is based on the respective keyframe-score of the optimal keyframe.

12. The method of claim 1, wherein the inputs from the first user correspond to inputs for navigating forward or backward through the optimal keyframes of the search result.

13. The method of claim 1, wherein the search-results interface further comprises, for each of one or more of the search results, a timeline-scrubber element, wherein the timeline-scrubber element comprises a timeline of the corresponding identified video of the search result and a visual depiction of points in the timeline that correspond to occurrences in the corresponding identified video of the optimal keyframes, and wherein the timeline-scrubber element further comprises a moveable scrubber component positioned proximate to the timeline, the position of the moveable scrubber component corresponding to a currently displayed optimal keyframe.

14. The method of claim 1, further comprising, for each of one or more of the search results, ordering the respective optimal keyframes for display based on the relative keyframe-scores of the respective optimal keyframes.

15. The method of claim 1, further comprising, for a particular search result:
receiving, from the client system of the first user, an indication of a trigger event associated with a particular optimal keyframe of the particular search result; and
causing, in response to the detection of the trigger event, the client system of the first user to play the corresponding identified video from a time-point of the particular optimal keyframe.

16. The method of claim 15, wherein the trigger event comprises an input by the first user to cause the particular optimal keyframe to be displayed for a threshold period of time.

17. The method of claim 1, wherein the search-results interface further comprises, for each of one or more of the search results, a display of a description of one or more of the respective optimal keyframes, the description of each respective optimal keyframe being based on one or more n-grams or media items extracted from one or more communications associated with a portion of the corresponding identified video that contains the respective optimal keyframe.

18. One or more computer-readable non-transitory storage media embodying software that is operable when executed to:
receive, from a client system of a first user, a search query inputted by the first user, wherein the search query is associated with one or more concepts;
identify one or more videos that match the search query;
retrieve, for each identified video, a set of keyframes for the identified video, each keyframe being a frame of the identified video, wherein each keyframe is associated with the one or more concepts associated with the search query;
calculate, for each keyframe of each identified video, a keyframe-score based on a prevalence of the one or more concepts associated with the keyframe, wherein the prevalence is determined with reference to the one or more concepts associated with each other keyframe in the set of retrieved keyframes for the identified video; and
send, to the client system of the first user, instructions for displaying a search-results interface comprising one or more search results corresponding to one or more of the identified videos, wherein each search result is displayed with one or more optimal keyframes for the corresponding identified video, wherein the optimal keyframes for the corresponding identified video are keyframes associated with the one or more concepts associated with the search query and having keyframe-scores greater than a threshold keyframe-score,
wherein each of one or more of the search results comprises a preview region, and
wherein the preview region displays the optimal keyframes of the search result, the display of the optimal keyframes being based on one or more inputs from the first user.

19. A system comprising: one or more processors; and a non-transitory memory coupled to the one or more processors comprising instructions executable by the one or more processors, the one or more processors operable when executing the instructions to:
receive, from a client system of a first user, a search query inputted by the first user, wherein the search query is associated with one or more concepts;

identify one or more videos that match the search query;
retrieve, for each identified video, a set of keyframes for the identified video, each keyframe being a frame of the identified video, wherein each keyframe is associated with the one or more concepts associated with the search query;
calculate, for each keyframe of each identified video, a keyframe-score based on a prevalence of the one or more concepts associated with the keyframe, wherein the prevalence is determined with reference to the one or more concepts associated with each other keyframe in the set of retrieved keyframes for the identified video; and
send, to the client system of the first user, instructions for displaying a search-results interface comprising one or more search results corresponding to one or more of the identified videos, wherein each search result is displayed with one or more optimal keyframes for the corresponding identified video, wherein the optimal keyframes for the corresponding identified video are keyframes associated with the one or more concepts associated with the search query and having keyframe-scores greater than a threshold keyframe-score,
wherein each of one or more of the search results comprises a preview region, and
wherein the preview region displays the optimal keyframes of the search result, the display of the optimal keyframes being based on one or more inputs from the first user.

* * * * *